US009677876B2

(12) United States Patent
Chang et al.

(10) Patent No.: US 9,677,876 B2
(45) Date of Patent: Jun. 13, 2017

(54) NON-DESTRUCTIVE AND OPTICAL MEASUREMENT AUTOMATION SYSTEM FOR WEB THICKNESS OF MICRODRILLS AND METHOD THEREOF

(71) Applicant: National Taiwan Ocean University, Keelung (TW)

(72) Inventors: Wen-Tung Chang, Taipei (TW); Jian-Hong Wu, Nantou County (TW)

(73) Assignee: National Taiwan Ocean University, Keelung (TW)

( * ) Notice: Subject to any disclaimer, the term of this patent is extended or adjusted under 35 U.S.C. 154(b) by 0 days.

(21) Appl. No.: 14/876,473

(22) Filed: Oct. 6, 2015

(65) Prior Publication Data

US 2016/0187121 A1 Jun. 30, 2016

(30) Foreign Application Priority Data

Dec. 30, 2014 (TW) .............................. 103146340 A

(51) Int. Cl.
G01B 11/24 (2006.01)

(52) U.S. Cl.
CPC ...... *G01B 11/2433* (2013.01); *G01B 11/2425* (2013.01)

(58) Field of Classification Search
CPC ........................ G01B 11/2425; G01B 11/2433
USPC ................................................ 356/625–640
See application file for complete search history.

(56) References Cited

U.S. PATENT DOCUMENTS

2012/0236139 A1 9/2012 Chang et al.
2015/0017879 A1 1/2015 Chang et al.

FOREIGN PATENT DOCUMENTS

| TW | I254124 B | 5/2006 |
| TW | I413756 B | 11/2013 |
| TW | I464363 B | 12/2014 |

OTHER PUBLICATIONS

Wen-Tung Chang et al., "An Optical-Based Method and System for the Web Thickness Measurement of Microdrills Considering Runout Compensation," International Journal of Precision Engineering and Manufacturing, vol. 14, No. 5, May 2013, pp. 725-734.

(Continued)

*Primary Examiner* — Tri T Ton
(74) *Attorney, Agent, or Firm* — Muncy, Geissler, Olds & Lowe, P.C.

(57) ABSTRACT

A non-destructive and optical measurement automation system for web thickness of microdrills and method thereof can obtain the measuring data corresponding to a certain section to be measured of a microdrill by means of automated optical measurement. Specifically speaking, the said system and method measure the section to be measured via an optical measuring plane formed by a measuring light beam, and the included angle between the optical measuring plane and the central axis of the microdrill is practically consistent with the helix angle of the microdrill. The said system and method then analyze the measuring data via a computer device to obtain the outer diameter and the depths of helical flutes corresponding to the section to be measured. Finally, the said system and method calculate the web thickness of the said section to be measured according to the outer diameter and the depths of helical flutes.

7 Claims, 27 Drawing Sheets

(56) References Cited

OTHER PUBLICATIONS

Wen-Tung Chang et al., "A visional-aided automation system for destructive web thickness measurement of microdrills," Int J Adv Manuf Technol (2014) 71: 983-1003.
Shui-Fa Chuang et al., "Nondestructive web thickness measurement of micro-drills with an integrated laser inspection system," Nondestructive Testing and Evaluation, vol. 25, No. 3, Sep. 2010, pp. 249-266.

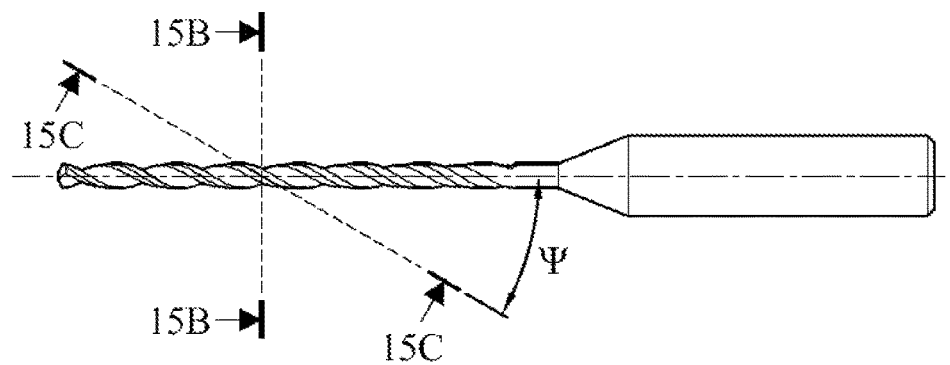
FIG. 15A
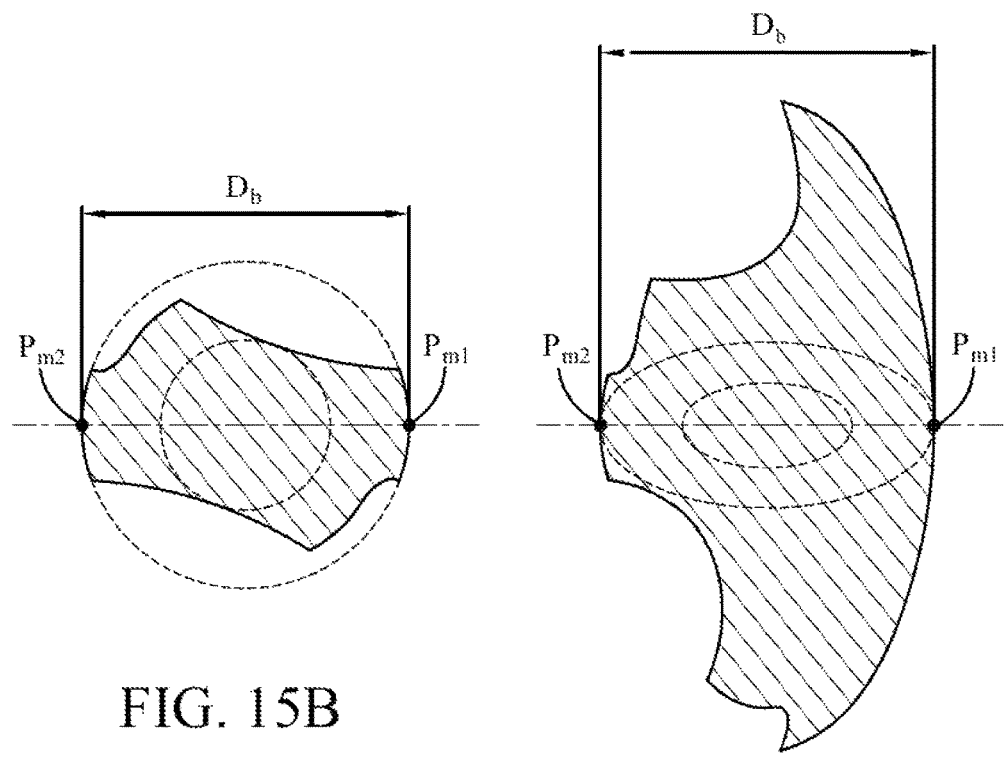
FIG. 15B
FIG. 15C

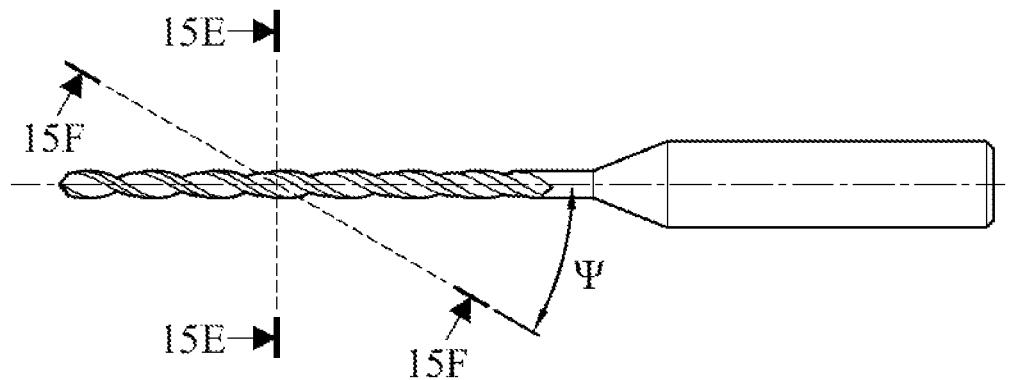
FIG. 15D
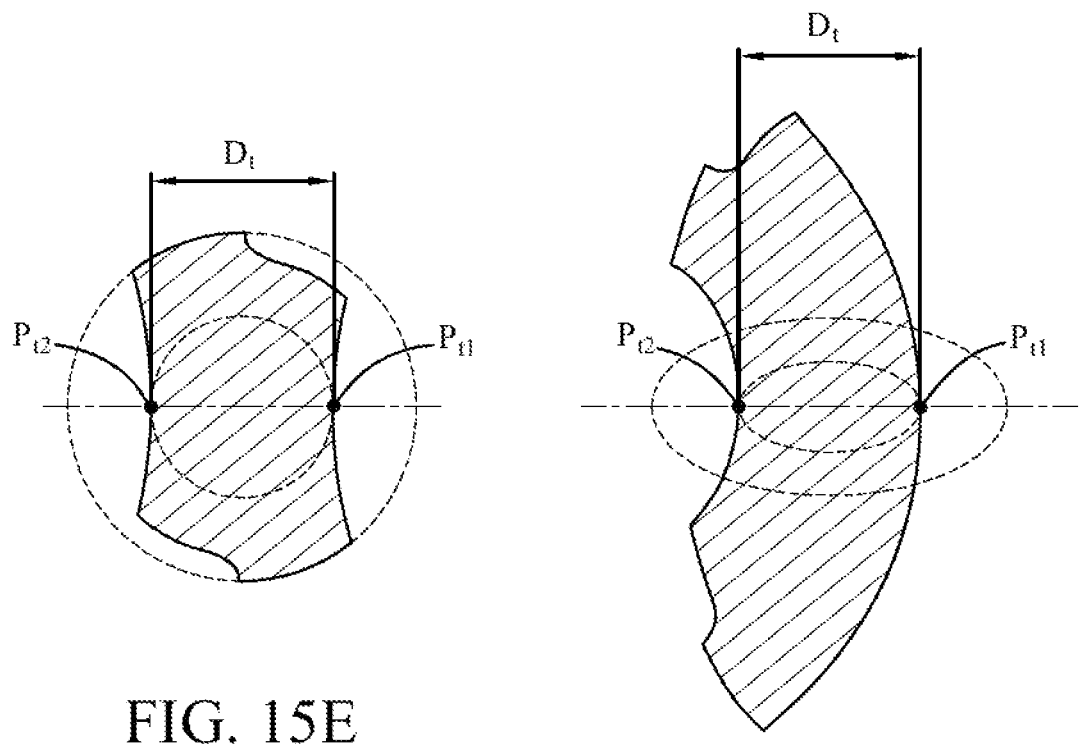
FIG. 15E
FIG. 15F

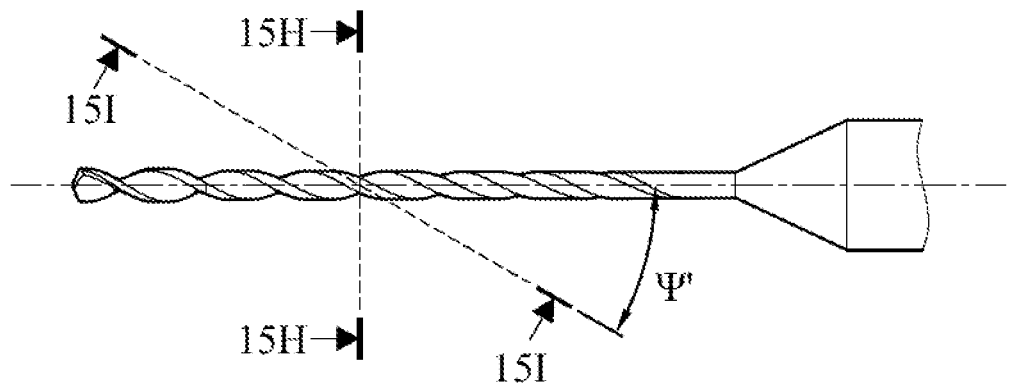
FIG. 15G
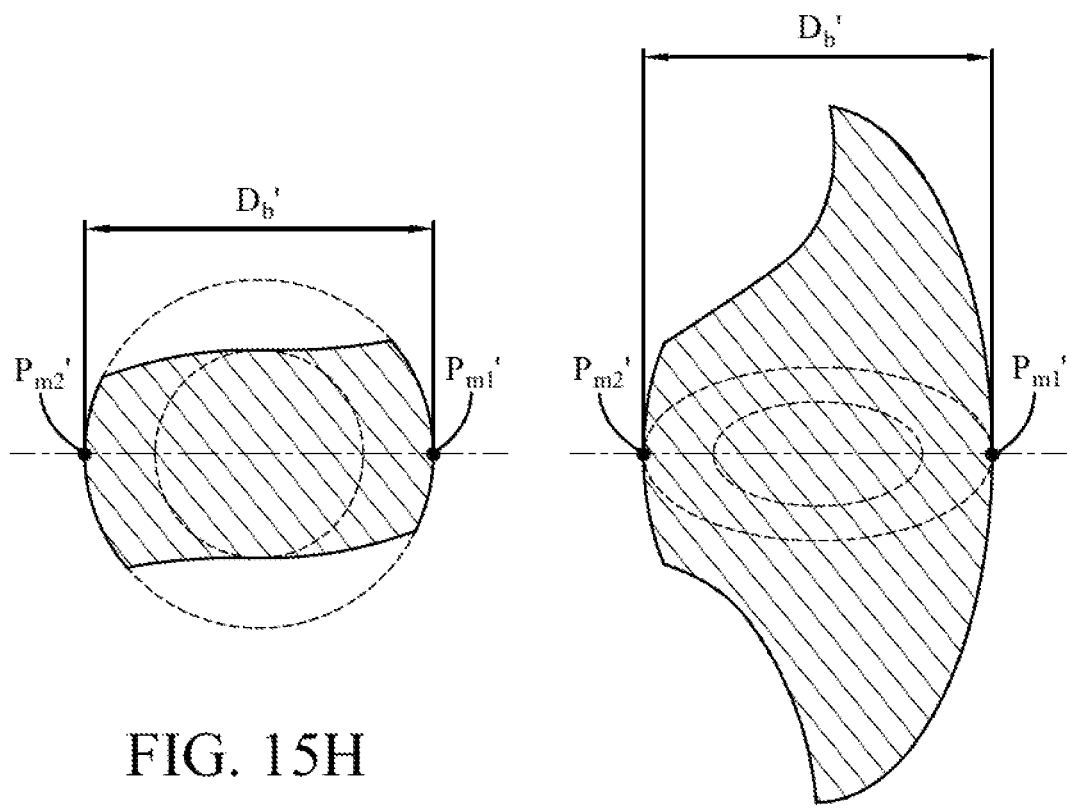
FIG. 15H
FIG. 15I

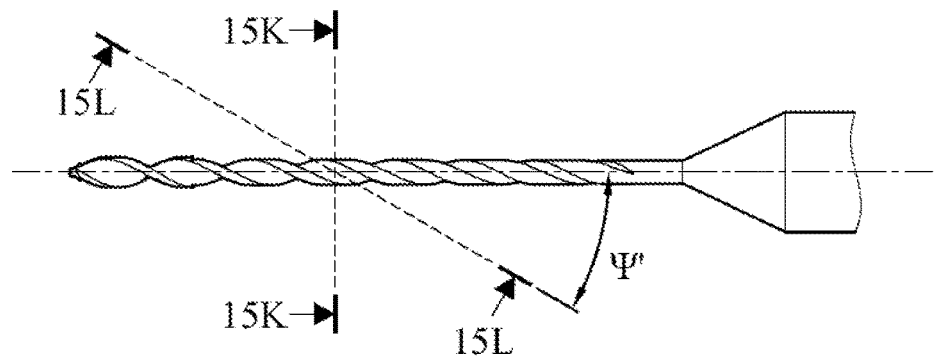
FIG. 15J
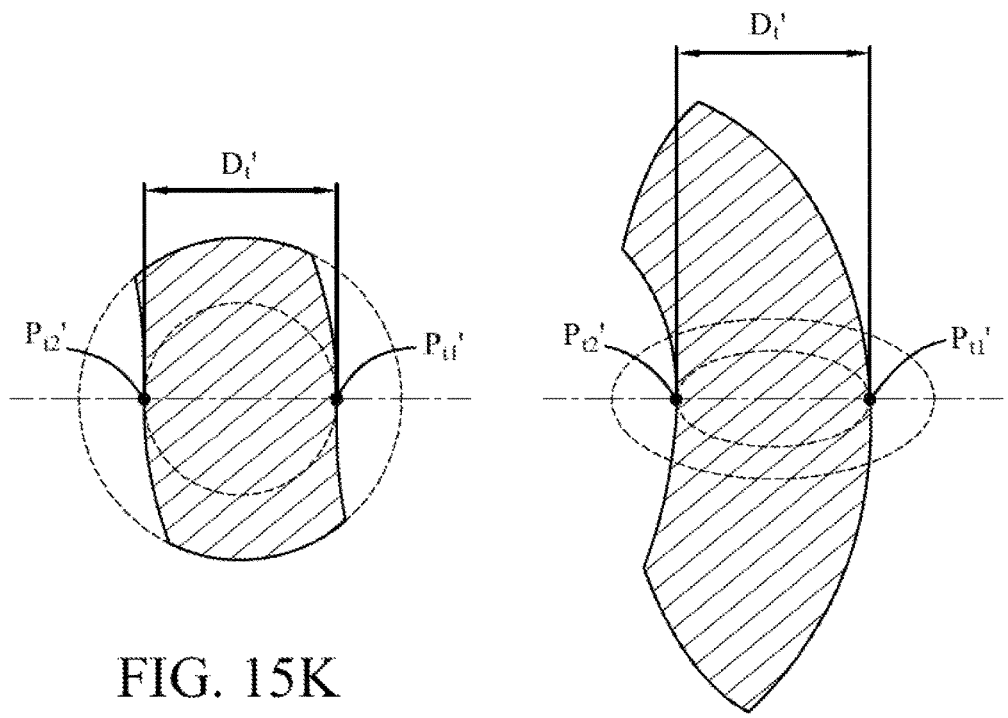
FIG. 15K
FIG. 15L

NON-DESTRUCTIVE AND OPTICAL MEASUREMENT AUTOMATION SYSTEM FOR WEB THICKNESS OF MICRODRILLS AND METHOD THEREOF

CROSS-REFERENCE TO RELATED APPLICATIONS

This non-provisional application claims priority under 35 U.S.C. §119(a) on Patent Application No. 103146340 filed in Taiwan, R.O.C. on Dec. 30, 2014, the entire contents of which are hereby incorporated by reference.

BACKGROUND

Technical Field

The present disclosure relates to an automation system for web thickness of microdrills and method thereof, particularly to a non-destructive and optical measurement automation system for web thickness of microdrills and method thereof.

Description of the Related Art

Microdrills nowadays have been widely applied to drill micro-holes in various printed circuit boards (PCB). Referring to FIG. 1A to FIG. 1C, the details of a microdrill 50 are described, where FIG. 1A is a schematic lateral view of a microdrill according to an embodiment, FIG. 1B is a sectional view of the microdrill in FIG. 1A along a section-line 1B-1B, and FIG. 1C is a sectional view of the microdrill in FIG. 1A along a section-line 1C-1C. The microdrill 50 is, for example, a standard type drill (ST type drill or called straight type drill), has a central axis 51, and includes a shank 52 and a drill body 54. The drill body 54 includes a drill point 60, helical flutes 58, and a drill tip 60a. The drill body 54 is magnified in scale relative to the shank 52 for ease of illustration. The drill body 54 is composed of the drill point 60 and the helical flutes 58 in function. The drill point 60 is used to produce a drilling action, and the helical flutes 58 are used to remove chips.

In the drill body 54, there is a conical core which has not been fluted and is called drill web 56, and the thickness of the drill web 56 (called the web thickness 62 hereinafter) conflict with a depth of the helical flute 58 in design. The microdrill 50 with a larger web thickness 62 can lead to good drill rigidity while the depth of the helical flute 58 is smaller, thus resulting in poor chip-removal ability. On the contrary, the helical flute 58 with a larger depth can lead to good chip-removal ability while the drill rigidity thereof is lower. Therefore, the web thickness 62 is a key parameter influencing quality of the microdrill 50. The measurement of the web thickness of microdrill products for improving manufacturing parameters is an important quality control task that microdrill manufacturers concern.

On the other hand, microdrills may be undercut type drills (UC type drills). Referring to FIG. 1D to FIG. 1F, the details of a UC type microdrill 50' are described, where FIG. 1D is a schematic lateral view of a microdrill according to an embodiment, FIG. 1E is a sectional view of the microdrill in FIG. 1D along a section-line 1E-1E, and FIG. 1F is a sectional view of the microdrill in FIG. 1D along a section-line 1F-1F. The microdrill 50' includes a shank 52' and a drill body 54'. The drill body 54' includes a drill point 60', helical flutes 58', and a drill tip 60a'. For the microdrill 50', the drill body 54' is ground to yield a UC diameter, i.e. the external diameter of the section along the section-line 1F-1F, which is smaller than the drill diameter, i.e. the external diameter of the section along the section-line 1E-1E. Therefore, during the duration of drilling, the microdrill 50' can effectively reduce the contact area between the drill body 54' and the wall of a drilled hole, thereby reducing the heat generated during drilling, and enhancing the quality of the drilled hole. Such a microdrill 50' is quite suitable to the drilling task for multi-layered PCBs.

In view of FIG. 1C, FIG. 1E and FIG. 1F, the sectional contour of the ST type microdrill 50 is different from that of the UC type microdrill 50'. The sectional contours of the two helical flutes 58 of the microdrill 50 are concave curves, so the web thickness 62 of the microdrill 50 is theoretically equal to the diameter of a minimum common tangent circle of the sectional contours of the two helical flutes 58 (i.e. the shortest distance between the sectional contours of the two helical flutes 58) and may be easily measured. On the other hand, since the drill body 54' of the microdrill 50' is ground to yield a UC diameter on the drill body 54' and is fluted with the grinding wheel whose wheel contour is made up of combinations of multiple arcs, the sectional contours of the two helical flutes 58' of the microdrill 50' are sigmoid or convex curves. The web thickness of the microdrill 50' is theoretically equal to the diameter of a maximum common tangent circle of the sectional contours of the two helical flutes 58'. Therefore, the web thickness of the microdrill 50' has such a complicated definition and is not easily measured.

The web thickness measuring methods of microdrills can be based on a non-destructive measuring technology or a destructive measuring technology in general. In practice, the destructive web thickness measuring methods, such as the two disclosures in the Taiwan Patent Publication No. I413756 and No. I464363, capture images of the microdrill through a machine vision module to sequentially execute the positioning procedure, grinding procedure, and image computing procedure to the microdrill for calculating the web thickness value of the microdrill at the sectional position to be measured. However, the drill body is ground off during the grinding procedure, so the destructive web thickness measuring methods are only suitable for sampling inspection. A non-destructive measurement device for web thickness of microdrills and method thereof is disclosed in the Taiwan Patent Publication No. I254124. The device measures the web thickness value of the microdrill at the sectional position to be measured through a line laser scanning system and a point laser distance measuring system. However, the non-destructive measurement technology for the web thickness still has problems of extremely high cost and insufficient measuring stability and measuring efficiency.

SUMMARY

A non-destructive and optical measurement automation system for measuring a web thickness of a microdrill includes a computer device, a linear motion stage, a rotary spindle-chuck, a rotary motion stage, and an optical sensor. The linear motion stage is electrically connected to the computer device and has a first carrying platform. According to an instruction of the computer device, the linear motion stage makes the first carrying platform move along a first axis parallel to a plane at which the first carrying platform locates. The rotary spindle-chuck is electrically connected to the computer device and is on the first carrying platform, for clamping the microdrill to make the central axis of the microdrill parallel to the first axis, and makes the microdrill rotate around the central axis of the microdrill according to the instruction of the computer device. The rotary motion stage is electrically connected to the computer device and has a second carrying platform. According to the instruction of the computer device, the rotary motion stage makes the second carrying platform rotate around a second axis perpendicular to a plane at which the second carrying platform locates, and the second axis is perpendicular to both the first axis and the central axis of the microdrill. The optical sensor includes a light emitting module and a detecting module. The light emitting module is on an end of the second carrying platform for emitting a light beam. The detecting module is electrically connected to the computer device and on the other end of the second carrying platform for receiving the light beam, so that a propagation path of the light beam forms an optical measuring plane parallel to the second axis, and when the microdrill is on the optical measuring plane, a sectional width, a first gap, and a second gap of the microdrill is measured, wherein the sectional width is a width of the light beam which is blocked by the microdrill and not received by the detecting module, and the first gap and the second gap are two widths of the light beam which are not blocked by the microdrill. The computer device, according to a helix angle of the microdrill, controls the second carrying platform to rotate around the second axis, and makes an included angle between the central axis of the microdrill and optical measuring plane be practically consistent with the helix angle and a section to be measured of the microdrill be on the optical measuring plane, and the computer device further controls the rotary spindle-chuck to rotate the microdrill around the central axis of the microdrill, and calculates the web thickness of the section to be measured according to the maximum sectional width measured by the detecting module during a cycle of rotation of the microdrill, the maximum first gap and the minimum first gap in a half cycle of rotation of the microdrill, and the maximum first gap and the minimum first gap in the other half cycle of rotation of the microdrill. The web thickness is calculated by the following equation (1):

$$\text{web thickness} = D - (d_1 + d_2) \quad (1)$$

D is the maximum sectional width measured by the detecting module during a cycle of rotation of the microdrill, and $d_1$ is a first helical flute depth of the section to be measured, and $d_2$ is a second helical flute depth of the section to be measured, and the first helical flute depth is the difference between the maximum first gap and the minimum first gap in the half cycle of rotation of the microdrill, and the second helical flute depth is the difference between the maximum first gap and the minimum first gap in the other half cycle of rotation of the microdrill.

A non-destructive and optical measurement method for measuring a web thickness of a microdrill includes setting a measurement parameter indicating a sectional position to be measured of the microdrill and a number of repeated measurements, providing an optical measuring plane by an optical sensor, wherein the optical measuring plane is formed by a propagation path of a light beam between the light emitting module of the optical sensor and the detecting module of the optical sensor, executing a drill tip positioning procedure to place a drill tip of the microdrill on the optical measuring plane, executing a helix angle measuring procedure to calculate a helix angle of the microdrill, making an included angle between the central axis of the microdrill and the optical measuring plane be practically consistent with the helix angle and placing the section to be measured of the microdrill on the optical measuring plane, rotating the microdrill around the central axis of the microdrill, measuring a sectional width, a first gap, and a second gap of the microdrill by the optical sensor, wherein the sectional width is a width of the light beam which is blocked by the microdrill and not received by the detecting module, and the first gap and the second gap are two widths of the light beam which are not blocked by the microdrill, and calculating the web thickness of the section to be measured according to the maximum sectional width measured by the optical sensor during a cycle of rotation of the microdrill, the maximum first gap and the minimum first gap in a half cycle of rotation of the microdrill, and the maximum first gap and the minimum first gap in the other half cycle of rotation of the microdrill. The web thickness is equal to the maximum sectional width measured by the detecting module during a cycle of rotation of the microdrill minus the sum of a first helical flute depth of the section to be measured and a second helical flute depth of the section to be measured, and the first helical flute depth is the difference between the maximum first gap and the minimum first gap in the half cycle of rotation of the microdrill, and the second helical flute depth is the difference between the maximum first gap and the minimum first gap in the other half cycle of rotation of the microdrill.

BRIEF DESCRIPTION OF THE DRAWINGS

The present disclosure will become more fully understood from the detailed description given hereinbelow and the accompanying drawings, which are given by way of illustration only and thus are not limitative of the present disclosure and wherein:

FIG. 15A is a schematic lateral view of a ST-type microdrill at the first angular position according to an embodiment;

FIG. 15B is a sectional view of a ST-type microdrill at the first angular position along a section line 15B-15B according to an embodiment;

FIG. 15C is a sectional view of a ST-type microdrill at the first angular position along a section line 15C-15C according to an embodiment;

FIG. 15D is a lateral view of a ST-type microdrill at the second angular position according to an embodiment;

FIG. 15E is a sectional view of a ST-type microdrill at the second angular position along a section line 15E-15E according to an embodiment;

FIG. 15F is a sectional view of a ST-type microdrill at the second angular position along a section line 15F-15F according to an embodiment;

FIG. 15G is a lateral view of a UC-type microdrill at the third angular position according to an embodiment;

FIG. 15H is a sectional view of a UC-type microdrill at the third angular position along a section line 15H-15H according to an embodiment;

FIG. 15I is a sectional view of a UC-type microdrill at the third angular position along a section line 15I-15I according to an embodiment;

FIG. 15J is a lateral view of a UC-type microdrill at the fourth angular position according to an embodiment;

FIG. 15K is a sectional view of a UC-type microdrill at the fourth angular position along a section line 15K-15K according to an embodiment;

FIG. 15L is a sectional view of a UC-type microdrill at the fourth angular position along a section line 15L-15L according to an embodiment;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings. In order to make the figures clear and specific, all figures in the embodiments are simplified diagrams for illustrating the methods and basic structures. Therefore, the units in the figures are not illustrated with specific numbers, shapes, sizes, or ratios. The practical specification or shape of the implementation is selective and can be more complicated than the examples in the figures.

Figure 1A:
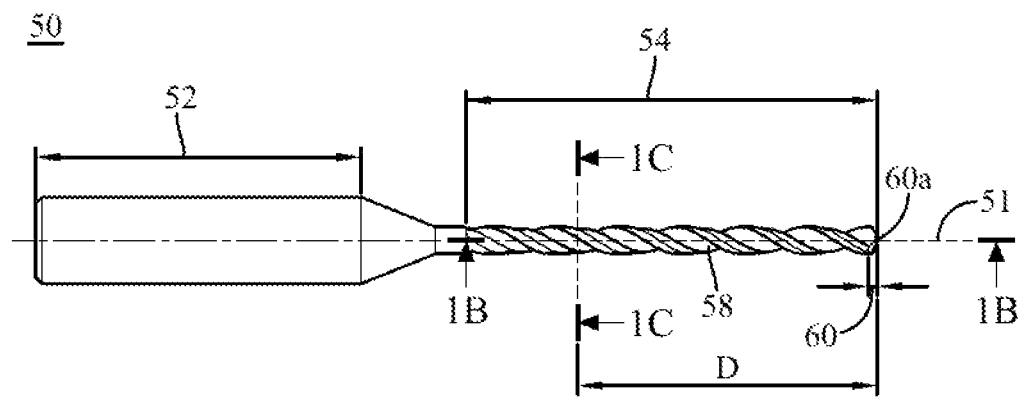
FIG. 1A is a schematic lateral view of a microdrill according to an embodiment.
Figure 1B:
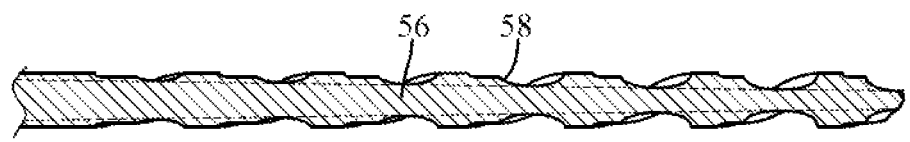
FIG. 1B is a sectional view of the microdrill in FIG. 1A along a section line 1B-1B.
Figure 1C:
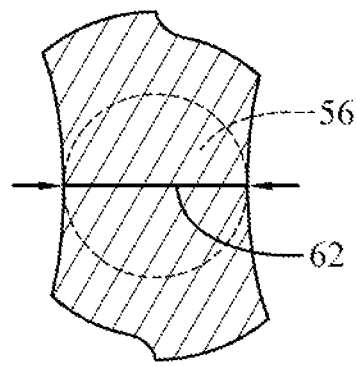
FIG. 1C is a sectional view of the microdrill in FIG. 1A along a section line 1C-1C.
Figure 1D:
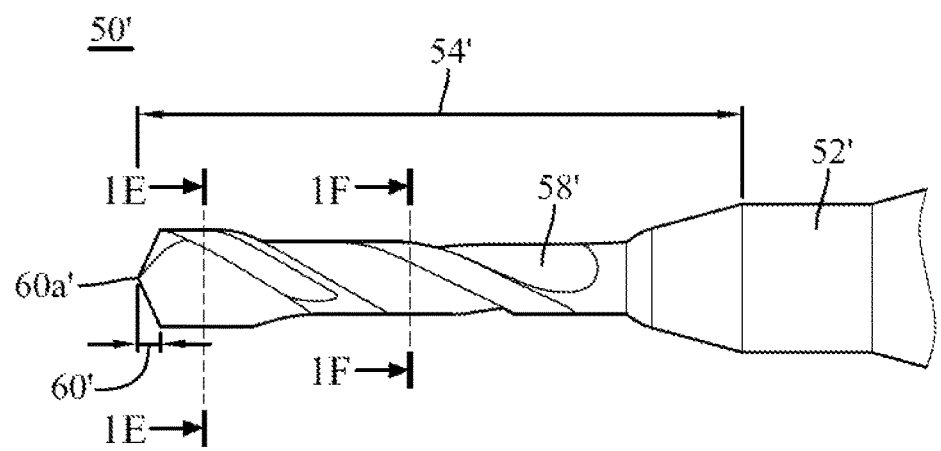
FIG. 1D is a schematic lateral view of a microdrill according to another embodiment.
Figure 1E:
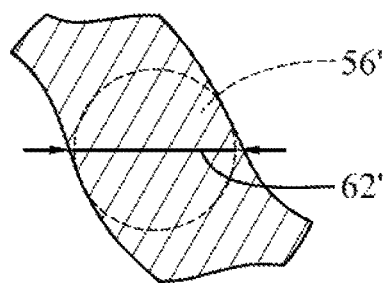
FIG. 1E is a sectional view of the microdrill in FIG. 1D along a section line 1E-1E.
Figure 1F:
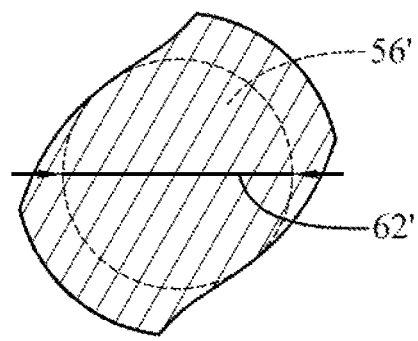
FIG. 1F is a sectional view of the microdrill in FIG. 1D along a section line 1F-1F.
Figure 2:
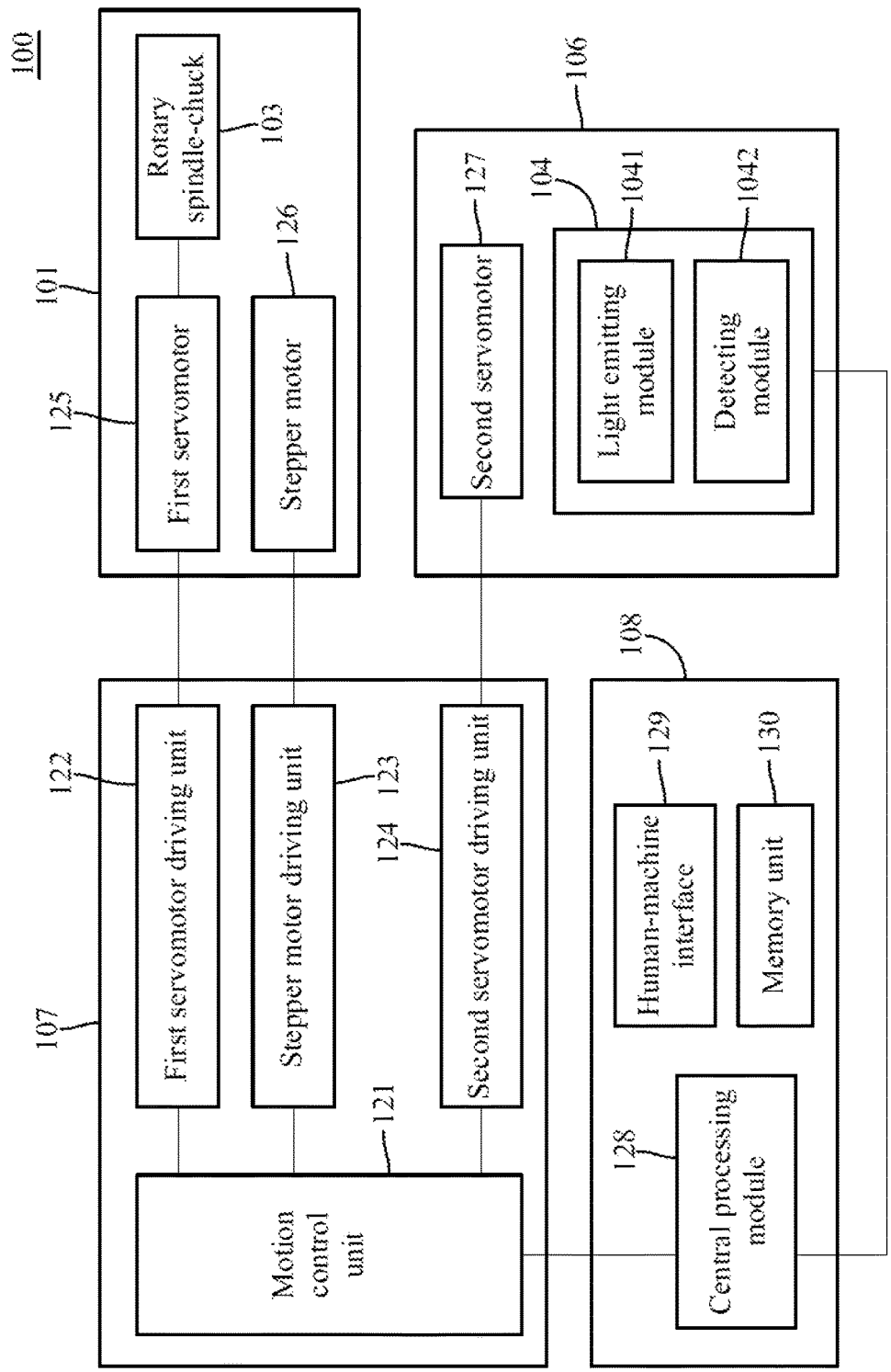
FIG. 2 is a schematic block diagram of a non-destructive and optical measurement automation system for web thickness of microdrills according to an embodiment.
Figure 3A:
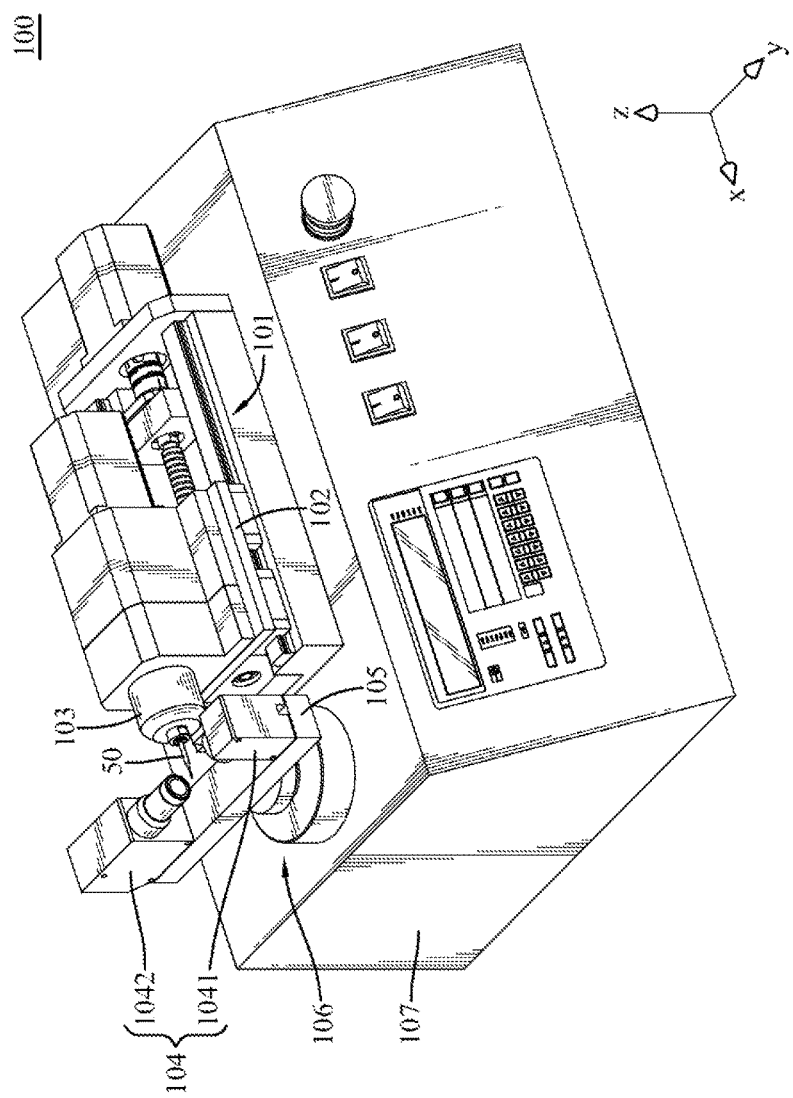
FIG. 3A is a schematic stereogram of a linear motion stage, a rotary spindle-chuck, a rotary motion stage, and an optical sensor according to an embodiment.
Figure 3B:
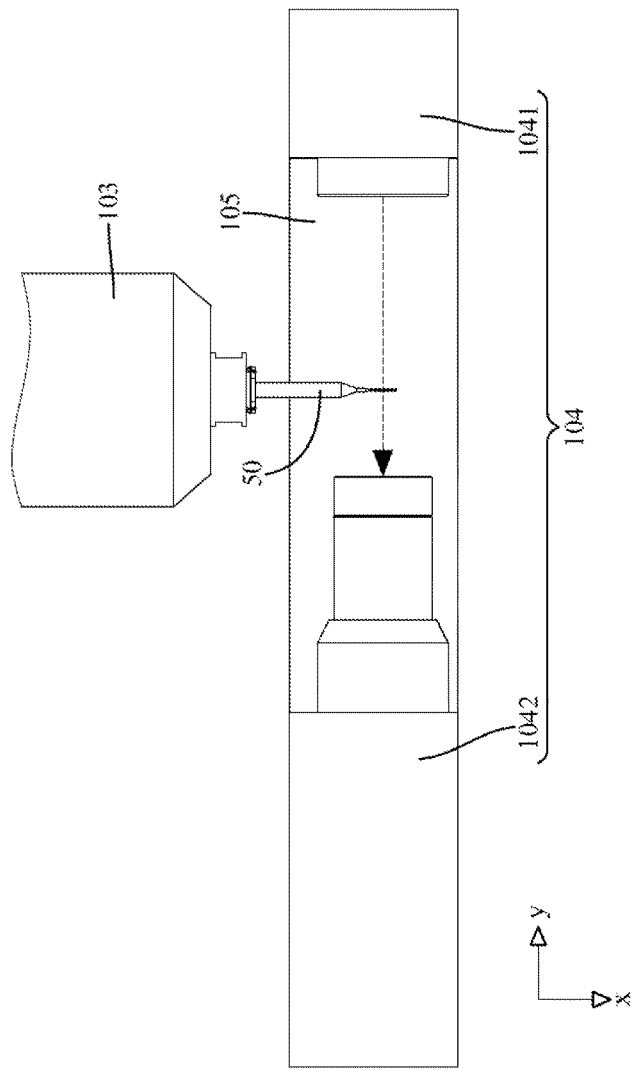
FIG. 3B is a partial top view of a linear motion stage, a rotary spindle-chuck, a rotary motion stage, and an optical sensor according to an embodiment.

Please refer to FIG. 2, FIG. 3A, and FIG. 3B. FIG. 2 is a schematic block diagram of a non-destructive and optical measurement automation system for web thickness of microdrills according to an embodiment. FIG. 3A is a schematic stereogram of a linear motion stage, a rotary spindle-chuck, a rotary motion stage, and an optical sensor according to an embodiment. FIG. 3B is a partial top view of a linear motion stage, a rotary spindle-chuck, a rotary motion stage, and an optical sensor according to an embodiment. In the present embodiment, the non-destructive and optical measurement automation system for web thickness of microdrills 100 is for measuring a web thickness 62 of a microdrill 50. It is worth mentioning that the explanations related to the microdrill 50 are also suitable for explaining a microdrill 50' in the following embodiments. In other words, the microdrill 50 generally refers to a standard type (ST-type) microdrill or an undercut type (UC-type) microdrill in the following explanations.

As shown in FIG. 2 and FIG. 3A, the non-destructive and optical measurement automation system for web thickness of microdrills 100 includes a linear motion stage 101, a rotary spindle-chuck 103, a rotary motion stage 106, an optical sensor 104, and a computer device 108. The optical sensor 104 further includes a light emitting module 1041 and a detecting module 1042. As shown in FIG. 3A, the linear motion stage 101 and the rotary motion stage 106 are on the first surface of a distribution box 107, and there is a default distance between the linear motion stage 101 and the rotary motion stage 106. The linear motion stage 101 has a first carrying platform 102 and the rotary spindle-chuck 103 is on the first carrying platform 102. The rotary motion stage 106 has a second carrying platform 105 and the optical sensor 104 is on the second carrying platform 105.

Specifically, the light emitting module 1041 of the optical sensor 104 is on an end of the second carrying platform 105, and the detecting module 1042 is on the other end of the second carrying platform 105. The aforementioned linear motion stage 101, rotary spindle-chuck 103, rotary motion stage 106, and detecting module 1042 of the optical sensor 104 are electrically connected to the computer device 108 respectively. The computer device 108 includes a central processing module 128, a human-machine interface 129, and a memory unit 130. The computer device 108 is but not limited to a personal computer or an electronic device with computational functions or man-machine interface.

Please refer to FIG. 2 and FIG. 3A again. In fact, the non-destructive and optical measurement automation system for web thickness of microdrills 100 further includes the distribution box 107. The distribution box 107 includes a motion control unit 121, a first servomotor driving unit 122, a stepper motor driving unit 123, and a second servomotor driving unit 124. The motion control unit 121 is electrically connected to the first servomotor driving unit 122, the stepper motor driving unit 123, the second servomotor driving unit 124, and the computer device 108 respectively. The first servomotor driving unit 122, the stepper motor driving unit 123, and the second servomotor driving unit 124 are respectively connected to a first servomotor 125, a stepper motor 126, and a second servomotor 127. Each of the functional modules of the non-destructive and optical measurement automation system for web thickness of microdrills 100 is explained hereinafter.

In the present embodiment, the linear motion stage 101 includes the stepper motor 126 and is for moving the first carrying platform 102 and the carried rotary spindle-chuck 103 along the x axis in FIG. 3B. When the rotary spindle-chuck 103 clamps the microdrill 50 for measuring, the central axis of the microdrill 50 is parallel to the aforementioned x axis. When the linear motion stage 101 drives the first carrying platform 102 with the carried rotary spindle-chuck 103 to move along the x axis, the microdrill 50 synchronously moves with the rotary spindle-chuck 103 along the moving direction. The linear motion stage 101 further includes the first servomotor 125 to drive the rotary spindle-chuck 103 to rotate. When the rotary spindle-chuck 103 clamps the microdrill 50 for measuring, the microdrill 50 rotates around the central axis of the microdrill 50 along with the rotary spindle-chuck 103 synchronously.

The rotary motion stage 106 includes the second servomotor 127 and is for the second carrying platform 105 and the carried optical sensor 104 to rotate around the second axis. The second axis is parallel to the z axis illustrated in FIG. 3A and is perpendicular to the plane formed by the x axis and the y axis. The second axis is further perpendicular to the central axis of the microdrill 50. The optical sensor 104 is but not limited to an optical micrometer and includes the light emitting module 1041 and the detecting module 1042. The light emitting module 1041 is for emitting the measuring light beam and the detecting module 1042 is for receiving the measuring light beam, so that the propagation path of the light beam forms an optical measuring plane parallel to the second axis.

Figure 4:
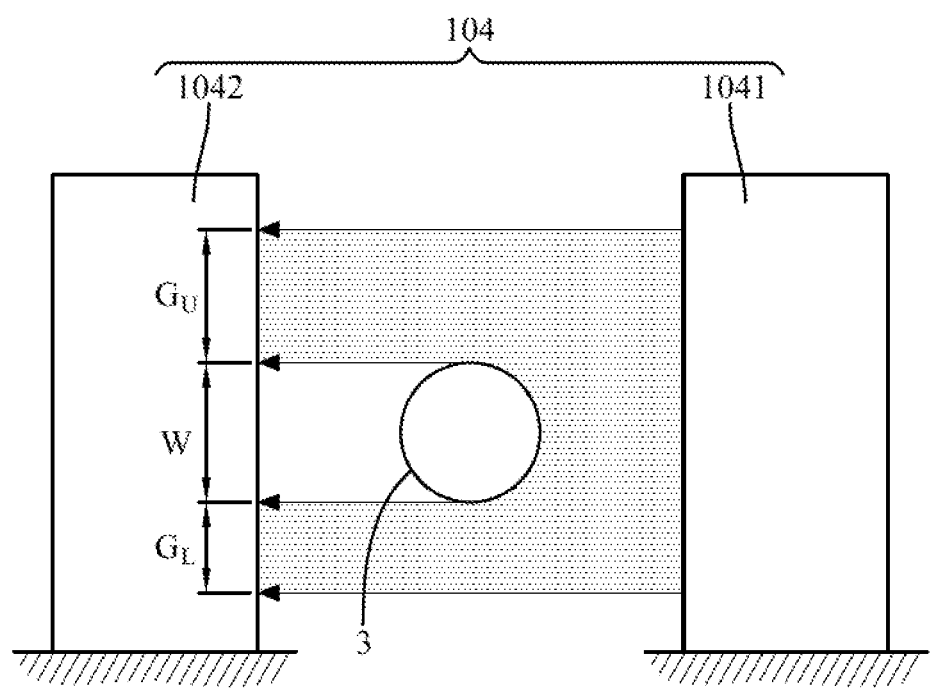
FIG. 4 is a diagram of measuring an object to be measured using the optical sensor according to an embodiment.

Please refer to FIG. 3B and FIG. 4. FIG. 4 is a diagram of measuring an object to be measured using the optical sensor according to an embodiment. As shown in FIG. 3B and FIG. 4, when an object to be measured 3 is placed in the propagation path of the measuring light beam, at least part of the measuring light beam is blocked by the object to be measured 3, and the detecting module 1042 currently measures the microdrill 50 and obtains a sectional width W of the microdrill 50, a first gap $G_U$, and a second gap $G_L$.

The sectional width W is the width of the light beam which is blocked by the microdrill 50 and not received by the detecting module 1042, and the first gap $G_U$ and the second gap $G_L$ are two widths of the light beam which are not blocked by the microdrill 50 and received by the detecting module 1042. The computer device 108 executes further analysis process according to the measured sectional width W, the first gap $G_U$, and the second gap $G_L$. The measuring light beam is but not limited the parallel light or line laser emitted by the light emitting diode. The detecting module 1042 is but not limited to a complementary metal-oxide-semiconductor (CMOS) or a charge coupled device (CCD).

In practice, besides determining the web thickness of the microdrill 50 according to the sectional width W, the first gap $G_U$ or the second gap $G_L$, the computer device 108 also determines the web thickness of the microdrill 50 according to other known parameter, the sectional width W, and one of the first gap $G_U$ or the second gap $G_L$. The following embodiment explains how the computer device 108 determines the web thickness according to the first gap $G_U$. However, persons skilled in the art can also determine the web thickness by various methods applying the sectional width W, the first gap $G_U$, or the second gap $G_L$. The following embodiment is for illustrating but not for limiting the present invention.

Figure 5A:
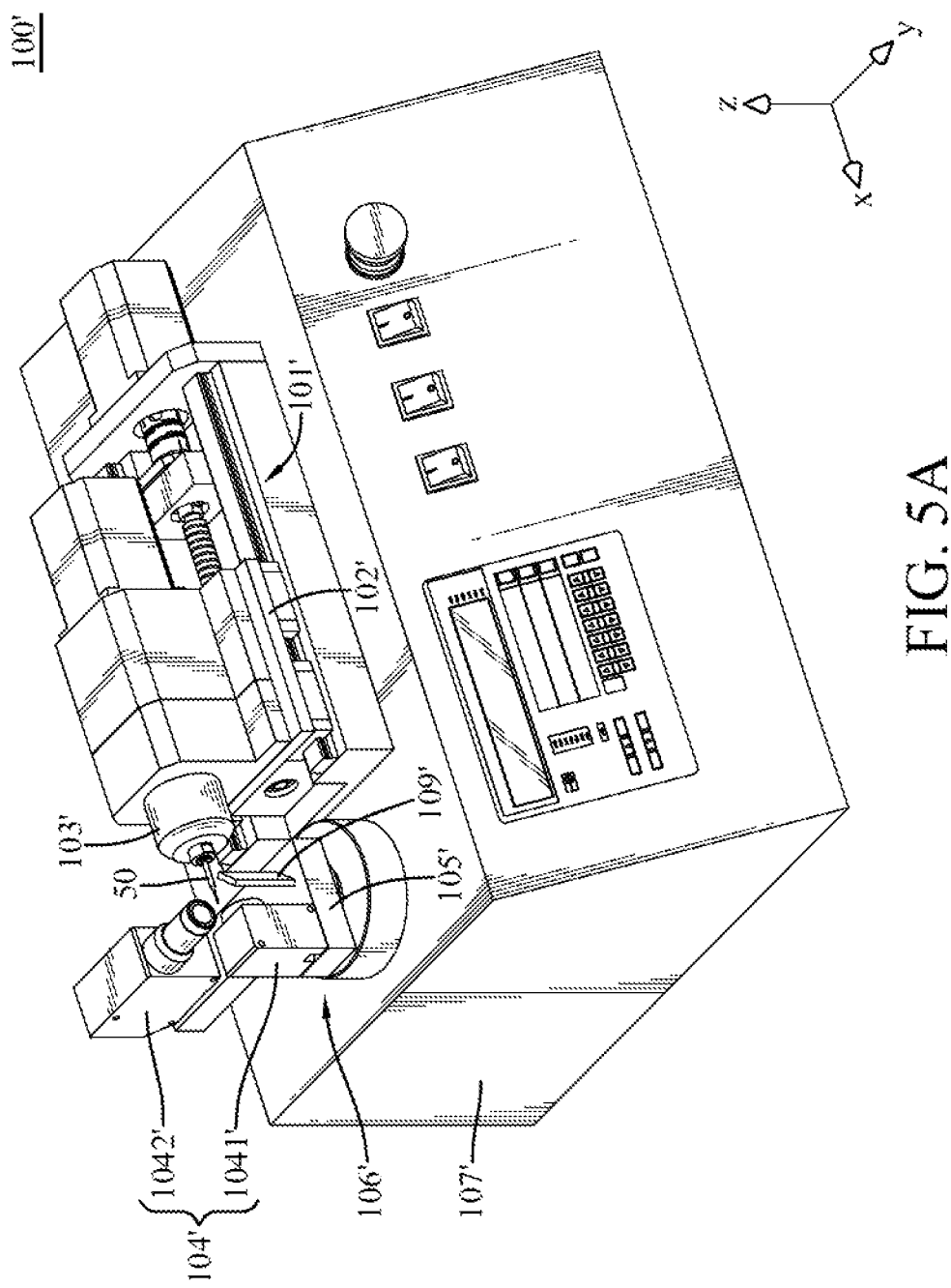
FIG. 5A is a schematic stereogram of a linear motion stage, a rotary spindle-chuck, a rotary motion stage, and an optical sensor according to another embodiment.
Figure 5B:
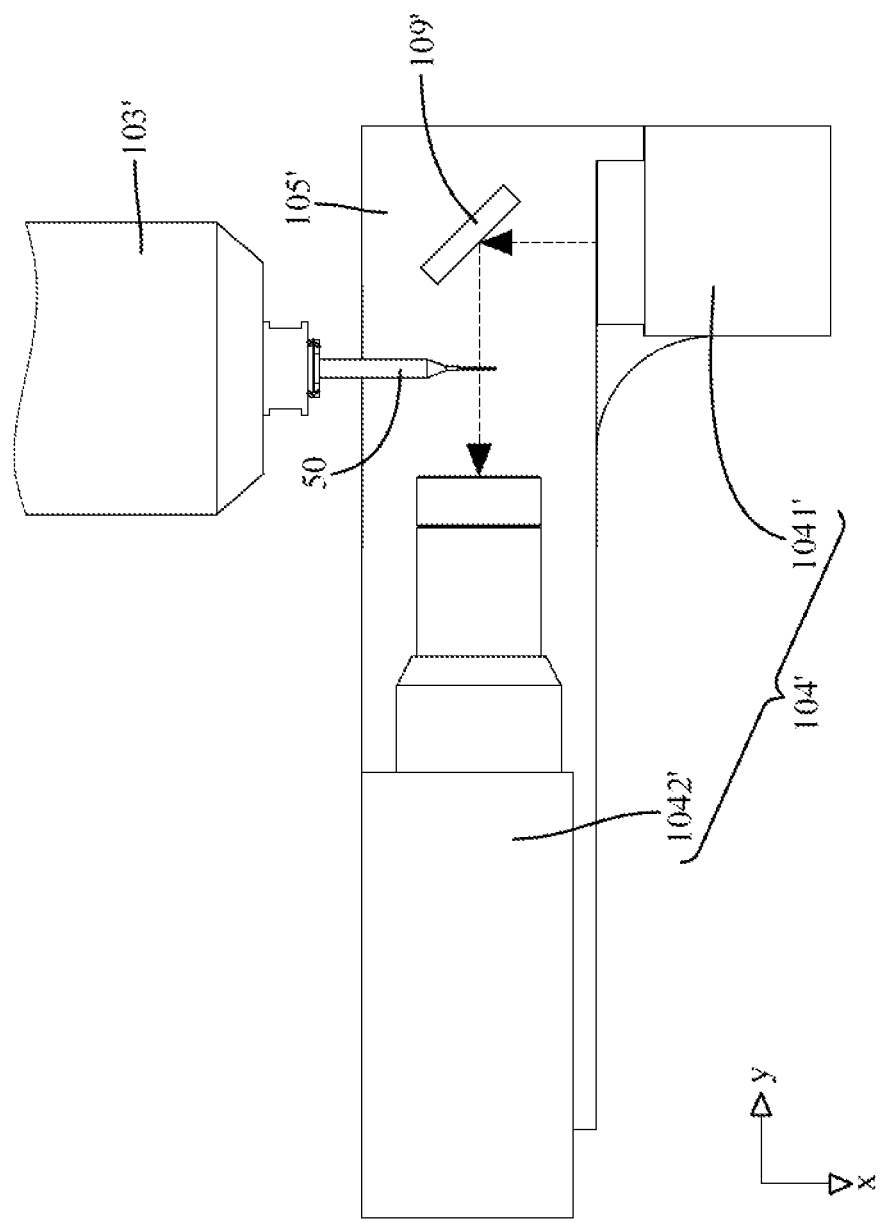
FIG. 5B is a partial top view of a linear motion stage, a rotary spindle-chuck, a rotary motion stage, and an optical sensor according to another embodiment.

Please refer to FIG. 5A and FIG. 5B. FIG. 5A is a schematic stereogram of a linear motion stage, a rotary spindle-chuck, a rotary motion stage, and an optical sensor according to another embodiment. FIG. 5B is a partial top view of a linear motion stage, a rotary spindle-chuck, a rotary motion stage, and an optical sensor according to another embodiment. As shown in FIG. 5A and FIG. 5B, the non-destructive and optical measurement automation system for web thickness of microdrills 100' includes a reflection mirror 109'. In the present embodiment, the measuring light beam emitted from the optical sensor 104' is incident on the reflection mirror 109' and then reflected by the reflection mirror 109', and the detecting module receives the reflected light. As shown in FIG. 5B, the computer device 108 drives the linear motion stage 101' to move the microdrill 50 to be on the propagation path of the reflected measuring light beam, so that the detecting module 1042' is able to measure the corresponding data.

Please refer to FIG. 2 continuously. The computer device 108 activates the first servomotor driving unit 122, the second servomotor driving unit 124, and the stepper motor driving unit 123 through the motion control unit 121 to drive the first servomotor 125, the second servomotor 127, and the stepper motor 126, so that the first carrying platform 102, the second carrying platform 105, and the rotary spindle-chuck 103 are further driven to move linearly or to rotate as the aforementioned ways. That is, a user uses the computer device 108 to instruct the non-destructive microdrill 50 web thickness measurement system 100 to move or rotate the microdrill 50 to measure the web thickness.

In fact, the user inputs the parameters through the human-machine interface 129 of the computer device 108, such as the type of the microdrill 50, the nominal parameter value, the position parameter, and other parameters related to the measurement for the non-destructive and optical measurement automation system for web thickness of microdrills 100 to adjust according to the practical measurement. In addition, the human-machine interface 129 is also for displaying the results during the operation of the measurement of the non-destructive and optical measurement automation system for web thickness of microdrills 100, so that the user can monitor the measurement synchronously.

In practice, the measurement process using the non-destructive and optical measurement automation system for web thickness of microdrills 100 includes a drill tip positioning procedure, a helix angle measuring procedure, and a web thickness measuring procedure. Specifically, the computer device 108 firstly moves the microdrill 50 to be measured to the determined positioning position according to the drill tip positioning procedure. The computer device 108 further measures the helix angle of the microdrill 50 to be measured according to the helix angle measuring procedure, and makes the angle between the microdrill 50 and the optical measuring plane formed by the emitted light beam from the optical sensor 104 be equal to the helix angle of the microdrill 50 to be measured. The computer device 108 further measures the web thickness of the microdrill 50 according to the web thickness measuring procedure. Each of the aforementioned procedures has a plurality of embodiments and the procedures are sequentially explained hereinafter.

In an embodiment, the non-destructive and optical measurement automation system for web thickness of microdrills executes the optical drill tip positioning procedure for positioning. In short, the drill tip positioning procedure in the present embodiment makes the microdrill 50 to proceed a reciprocation relative to the optical measuring plane provided by the measuring light beam, so that the drill tip 60a approaches the optical measuring plane. During the reciprocation, the computer device 108 determines whether the drill tip 60a reaches the optical measuring plane formed by the light beam according to the data measured by the optical sensor 104, so that the microdrill 50 is placed on the position which the procedure wants to achieve.

For example, please refer to FIG. 6A~6E. FIG. 6A~6E are diagrams of relative position between the drill tip and the measuring light beam at each time point in the drill tip positioning procedure according to an embodiment. The computer device 108 drives the linear motion stage 101 to move the microdrill 50 for measuring to a starting position, and determines whether the drill tip 60a of the microdrill 50 to be measured is in a first zone $Z_1$ or a second zone $Z_2$ of the optical measuring plane 71 according to the measured data obtained from the optical sensor 104. As shown in FIG. 6A~6E, when the drill tip 60a is in the first zone $Z_1$, part of the microdrill 50 to be measured is on the propagation path of the measuring light beam emitted from the optical sensor 104. In other words, the optical measuring plane 71 passes part of the microdrill 50 to be measured. Therefore, the optical sensor 104 senses the measuring light beam which is partially blocked by the microdrill 50, and the computer device 108 determines that the drill tip 60a is in the first zone $Z_1$ according to the value read from the optical sensor 104. Similarly, when the drill tip 60a is in the second zone $Z_2$, the optical measuring plane does not pass the microdrill 50, so the microdrill 50 does not block the measuring light beam emitted from the optical sensor 104. Therefore, the optical sensor 104 senses the complete measuring light beam and the computer device 108 determines that the drill tip 60a is in the second zone $Z_2$ according to the value read from the optical sensor 104.

Figure 6A:
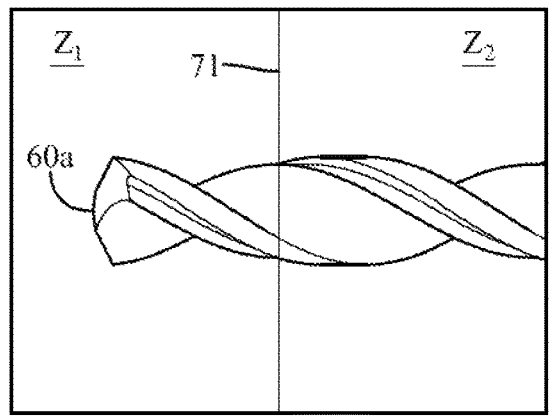
FIG. 6A is a diagram of relative position between the drill tip and the measuring light beam at the first time in the drill tip positioning procedure according to an embodiment.
Figure 6B:
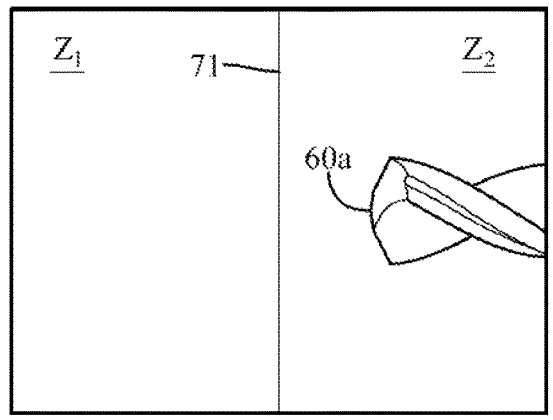
FIG. 6B is a diagram of relative position between the drill tip and the measuring light beam at the second time in the drill tip positioning procedure according to an embodiment.
Figure 6C:
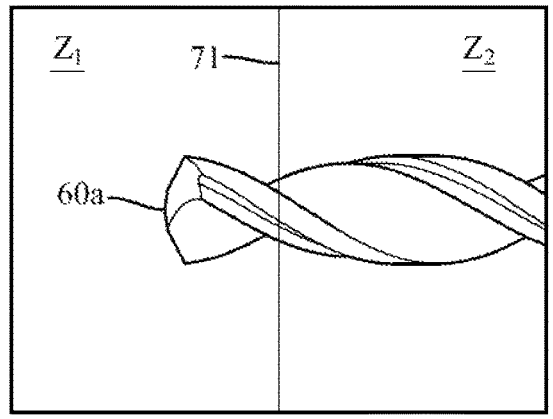
FIG. 6C is a diagram of relative position between the drill tip and the measuring light beam at the third time in the drill tip positioning procedure according to an embodiment.
Figure 6D:
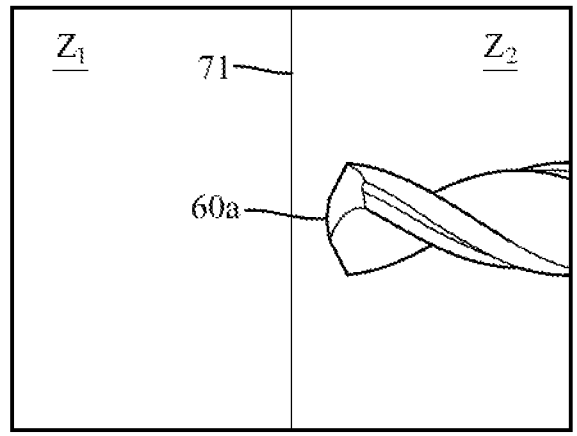
FIG. 6D is a diagram of relative position between the drill tip and the measuring light beam at the fourth time in the drill tip positioning procedure according to an embodiment.
Figure 6E:
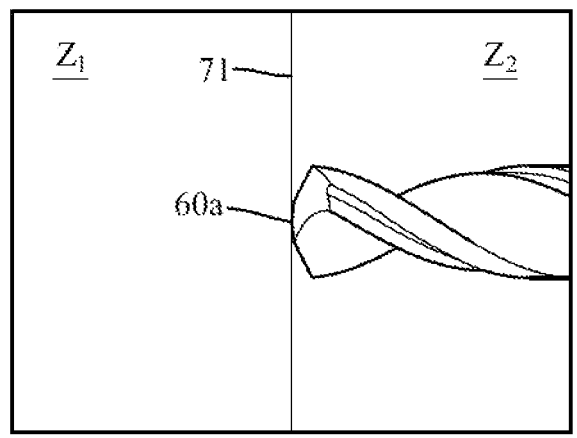
FIG. 6E is a diagram of relative position between the drill tip and the measuring light beam when the positioning process is finished in the drill tip positioning procedure according to an embodiment.

Extending from the previous embodiment, in the moment of FIG. 6A, the computer device 108 determines that the drill tip 60a is in the first zone $Z_1$ according to the measured value from the optical sensor 104. Next, the computer device 108 drives the linear motion stage 101 to move the first carrying platform 102 a first default distance along the x axis, that is, the drill tip 60a of the microdrill 50 is moved the first default distance to the second zone $Z_2$, so that the relative position between the microdrill 50 and the optical measuring plane 71 is shown as FIG. 6B. The computer device 108 determines that the drill tip 60a is in the second zone $Z_2$ according to the measured value from the optical sensor 104, and drives the linear motion stage 101 to move the drill tip 60a a second default distance to the first zone $Z_1$, that is, the position shown in FIG. 6C. The second default distance is less than the first default distance. Next, after gradually decreasing the moving default distance with the continuously repeated reciprocation, the relative position between the drill tip 60a and the optical measuring plane 71 is sequentially shown in FIG. 6C and FIG. 6D. The distance between the drill tip 60a and the optical measuring plane 71 is correspondingly decreased as the number of the repeated reciprocation increases. In the moment shown in FIG. 6E, the computer device 108 determines that the microdrill reaches the optical measuring plane 71 according to a default condition, and the drill tip positioning procedure is finished. The default condition is, for example, a tiny default sectional width formed by overlapping the drill tip 60a and the optical measuring plane 71, the number of the reciprocation which reaches a default threshold value, or a decreased default distance of the reciprocation which is less than a default threshold value.

Figure 7:
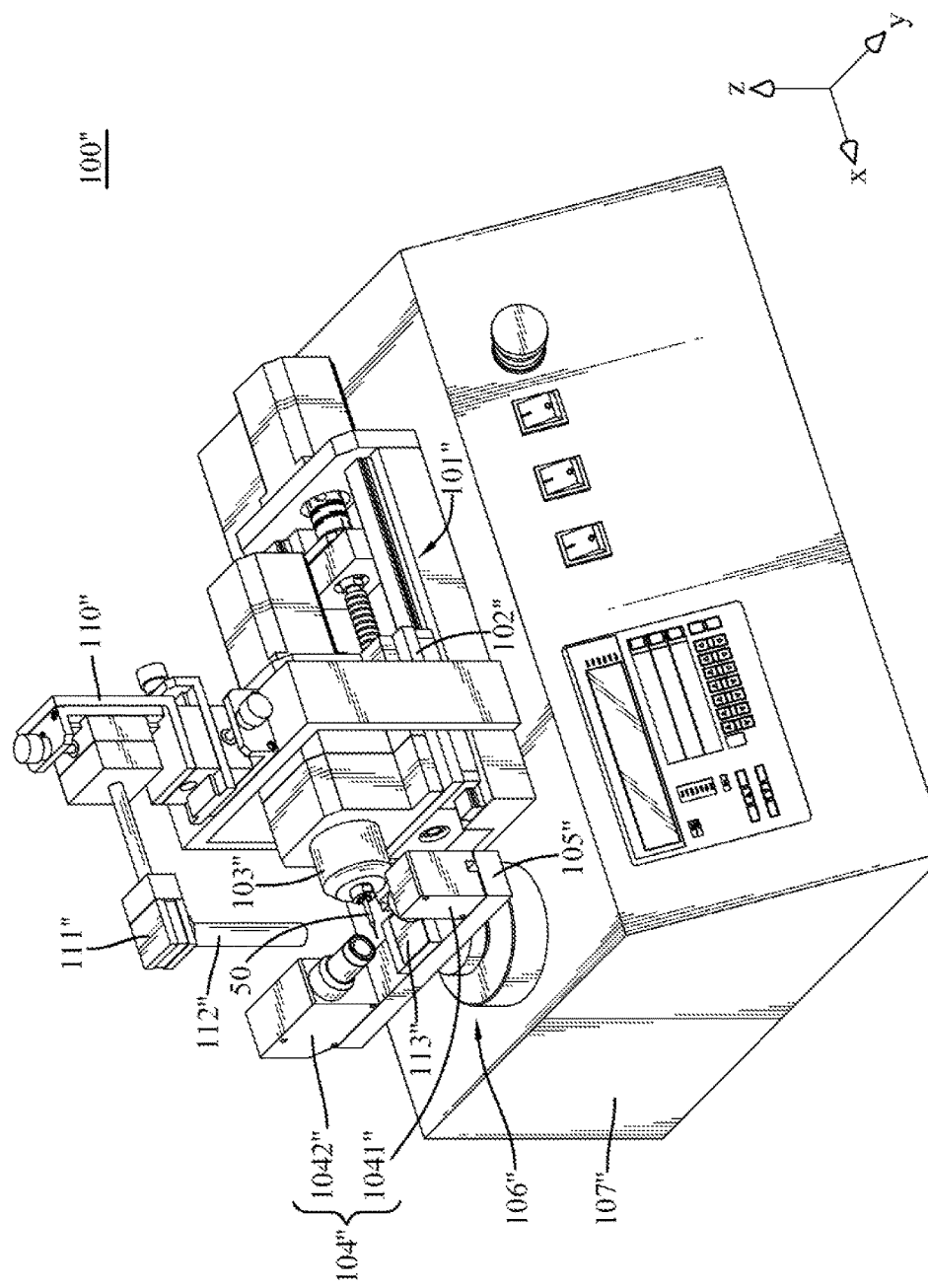
FIG. 7 is a schematic stereogram of a linear motion stage, a rotary spindle-chuck, a rotary motion stage, and an optical sensor according to a further embodiment.

In fact, when the non-destructive and optical measurement automation system for web thickness of microdrills 100 further includes a machine vision module, the non-destructive and optical measurement automation system for web thickness of microdrills further applies an image-based drill tip positioning procedure for positioning. Please refer to FIG. 7. FIG. 7 is a schematic stereogram of a linear motion stage, a rotary spindle-chuck, a rotary motion stage, and an optical sensor according to a further embodiment. As shown in FIG. 7, the non-destructive and optical measurement automation system for web thickness of microdrills 100" further includes a supporting structure 110", a camera 111", a lens 112", and a back light source 113". The supporting structure 110" is on the distribution box 107", and a side of the camera 111" is connected to the supporting structure 110", and the other sided of the camera 111" is connected to the lens 112". Specifically, the camera 111", supported by the supporting structure 110", captures the microdrill image formed by the microdrill 50 through the lens 112" from the z axis to x-y plane. The back light source 113" is on the second carrying platform 105", and between the light emitting module 1041" and the detecting module 1042". The back light source 113" is for providing the light source for the camera 111".

Figure 8A:
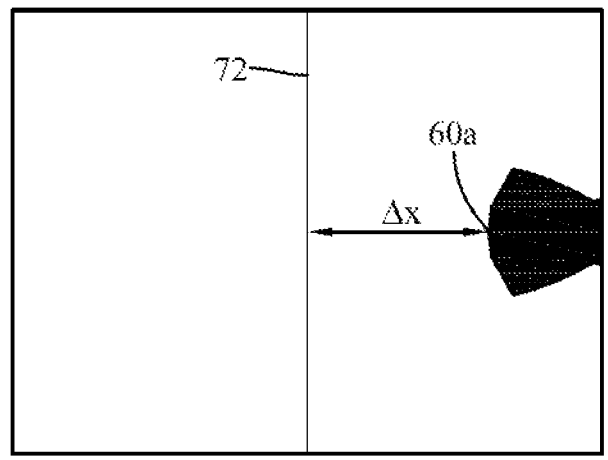
FIG. 8A is a diagram of relative position between the drill tip and the measuring light beam at the starting position in the image-based drill tip positioning procedure according to an embodiment.
Figure 8B:
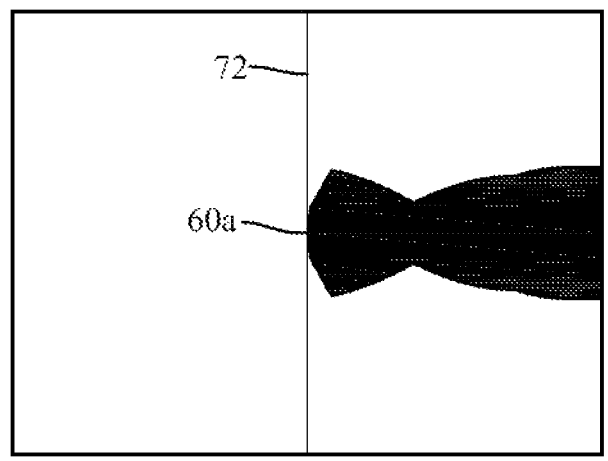
FIG. 8B is a diagram of relative position between the drill tip and the measuring light beam when the positioning process is finished in the image-based drill tip positioning procedure according to an embodiment.

As the aforementioned explanation, in the embodiment corresponding to FIG. 7, the non-destructive and optical measurement automation system for web thickness of microdrills 100" executes the image-based drill tip positioning procedure for positioning. Please refer to FIGS. 8A and 8B. FIG. 8A is a diagram of relative position between the drill tip and the measuring light beam at the starting position in the image-based drill tip positioning procedure according to an embodiment. FIG. 8B is a diagram of relative position between the drill tip and the measuring light beam when the positioning process is finished in the image-based drill tip positioning procedure according to an embodiment.

In the image-based drill tip positioning procedure, the computer device 108 firstly drives the linear motion stage 101" to move the first carrying platform 102" along the x axis, so that the microdrill 50 to be measured is placed in a starting position. The relative position between the microdrill 50 to be measured in the starting position and the optical measuring plane 72 formed by the measuring light beam is shown in FIG. 8A. The optical measuring plane 72 is a virtual reference plane obtained from the relative position corresponding to the optical measuring plane 71 in the image captured by the camera 111". Currently, there is a positioning distance Δx between the drill tip 60a of the microdrill 50 and the optical measuring plane 72. The camera 111" captures the image shown in FIG. 8A through the lens 112", and the computer device 108 determines the distance between the drill tip 60a and the optical measuring plane 72 more specifically according to the captured image. The distance between the drill tip 60a and the optical measuring plane 72 is the value of the positioning distance Δx. For example, the computer device 108" determines the value of the positioning distance Δx by calculating the pixel numbers of the positioning distance Δx in the image, and persons skilled in the art can design the calculations according to the need. When the computer device 108 determines the value of the positioning distance Δx, the computer device 108 drives the linear motion stage 101" to move according to the positioning distance Δx, so that the positioning distance Δx is less than a default threshold value and the drill tip 60a approaches the optical measuring plane 72. The aforementioned default threshold value is but not limited to pixel numbers or other unit of length. The present embodiment is for illustrating but not for limiting the present invention.

Figure 9:
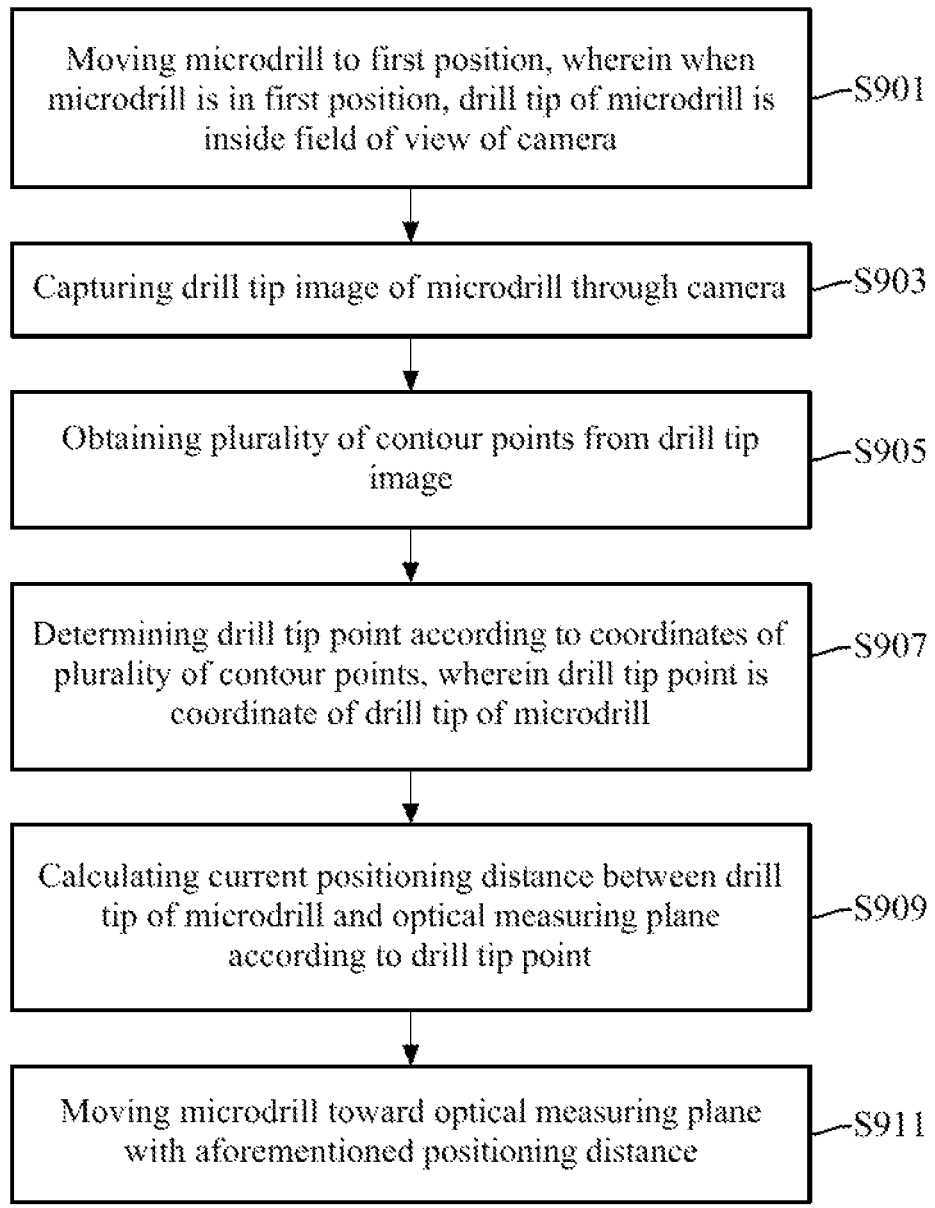
FIG. 9 is a flowchart of an image-based drill tip positioning procedure according to a further embodiment.

The aforementioned explanation corresponds to an image-based drill tip positioning procedure. Please refer to FIG. 9 for the assistant explanation. FIG. 9 is a flowchart of an image-based drill tip positioning procedure according to a further embodiment. The image-based positioning procedure includes the following steps. In the step S901, the microdrill 50 is moved to a first position, wherein when the microdrill 50 is in the first position, the drill tip of the microdrill 50 is inside the field of view of the camera 111". In the step S903, the drill tip image of the microdrill 50 is captured through the camera 111". In the step S905, a plurality of contour points are obtained from the drill tip image. In the step S907, a drill tip point is determined according to the coordinates of the plurality of contour points, wherein the drill tip point is the coordinate of the drill tip 60a of the microdrill 50. In the step S909, the current distance between the drill tip of the microdrill 50 and the optical measuring plane 72 is calculated according to the drill tip point. In the step S911, the microdrill is moved toward the optical measuring plane with the aforementioned distance.

After the drill tip positioning procedure is finished according to the aforementioned optical-based or image-based drill tip positioning procedure, the non-destructive and optical measurement automation system for web thickness of microdrills 100, 100', or 100" further measures the helix angle corresponding to the microdrill 50 to be measured according to a helix angle measuring procedure. According to the different structure of the non-destructive and optical measurement automation system for web thickness of microdrills 100 (and 100') and 100", the helix angle measuring procedure can be separated to optical-based and image-based. The optical-based and image-based helix angle measuring procedures are explained in the following embodiments corresponding to FIG. 3A and FIG. 7.

Figure 10A:
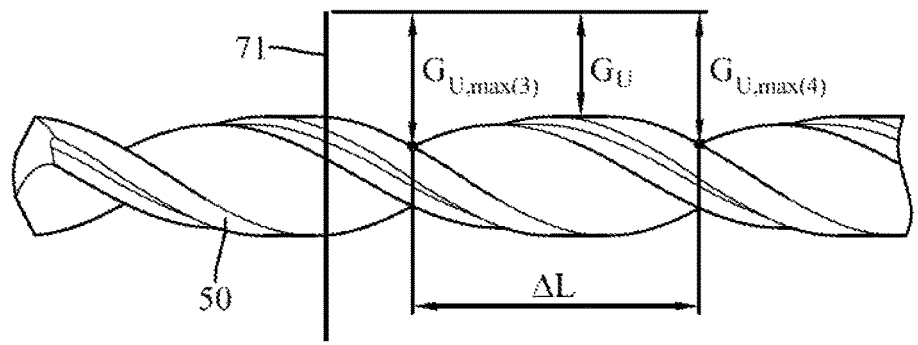
FIG. 10A is a diagram of the needed parameters corresponding to the shape of the microdrill in the optical-based helix angle measuring procedure according to an embodiment.

In the embodiment corresponding to FIG. 3A, the non-destructive and optical measurement automation system for web thickness of microdrills 100 measures the helix angle according to the optical-based helix angle measuring procedure. Please refer to FIG. 10A. FIG. 10A is a diagram of the needed parameters corresponding to the shape of the microdrill in the optical-based helix angle measuring procedure according to an embodiment. In the optical-based helix angle measuring procedure of the present embodiment, the first starting position of the microdrill 50 in the beginning is identical to the positioning position after the drill tip positioning procedure is finished. Next, the computer device 108 drives the linear motion stage 101 to move the microdrill 50 along the x axis a default distance to a second starting position, so that a certain part of the drill body 54 of the microdrill 50 is on the optical measuring plane 71 formed by the light beam.

Figure 10B:
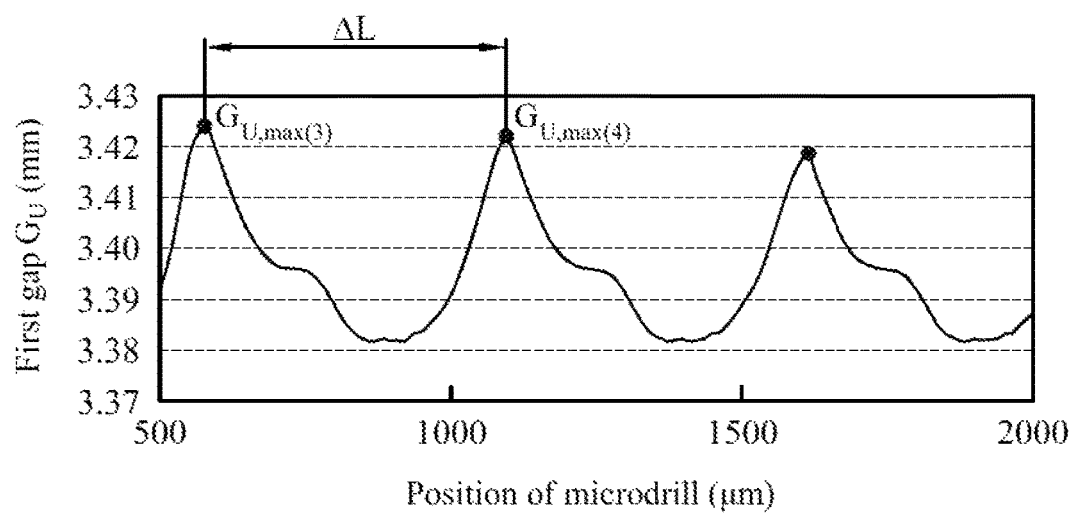
FIG. 10B is a diagram of curve of a plurality of first gap values corresponding to the positions of the microdrill measured by the optical-based helix angle measuring procedure according to an embodiment.

Next, the computer device 108 drives the linear motion stage 101 to move a second default distance, so that at least one pitch of the drill body 54 passes the optical measuring plane 71 formed by the light beam, and the optical sensor 104 further measures a plurality of first gaps $G_U$ corresponding to the amount of movement of the at least one pitch. The plurality of first gaps $G_U$ further includes a plurality of maximum first gaps, such as the first gaps $G_{U,max(3)}$, $G_{U,max(4)}$ shown in FIG. 10A. Please refer to FIG. 10B. FIG. 10B is a diagram of curve of a plurality of first gap values corresponding to the positions of the microdrill measured by the optical-based helix angle measuring procedure according to an embodiment. The values in the vertical axis of FIG. 10B are the first gaps $G_U$, and the values in the horizontal axis are the positions of the microdrill 50 corresponding to the first gaps $G_U$. The units of the horizontal axis and the vertical axis are defined by persons skilled in the art. The present embodiment is for illustrating but not for limiting the present invention.

As shown in FIG. 10B, when the contour of the microdrill 50 concaves toward the direction of the central axis, the first gap increases accordingly, and when the contour of the microdrill 50 bulges, the first gap decreases accordingly. Therefore, the variation curve of the first gap illustrated in FIG. 10B is opposite to the contour of the microdrill illustrated in FIG. 10A. Besides, the computer device 108 illustrates a figure according to the values of the first gap $G_U$ measured by the optical sensor 104 for users, such as the figure shown in FIG. 10B. Practically, each of the values of the first gap $G_U$ is stored in a memory unit 130 of the computer device 108, and is further analyzed by the computer device 108 when the detecting module 1042 measures all of the values of the first gap $G_U$. The helix angle measuring procedure is explained with FIG. 10B as follows and persons skilled in the art can understand that practically the computer device 108 does not actually create a figure accordingly before the analysis.

Extending from the previous embodiment, when all of the values of the first gap $G_U$ are measured, the computer device 108 determines at least two adjacent maximum first gaps $G_{U,max}$ or at least two adjacent minimum first gaps $G_{U,min}$. Taking the maximum for example, the computer device 108 firstly determines the pitch ΔL which is represented by the distance between the two adjacent maximum $G_{U,max(3)}$ and the $G_{U,max(4)}$ illustrated in FIG. 10B. The pitch ΔL is half of the lead value because a geometrical design of symmetrically dual helical flutes is usually applied to microdrills. Therefore, the lead value equals to 2ΔL. In addition, the lead value 2ΔL and the nominal outer diameter value $D_n$ of the drill body of the microdrill are substituted into the equation (2):

$$\Psi \approx \tan^{-1}\left(\frac{\pi D_n}{2\Delta L}\right) \quad (2)$$

Therefore, the approximate value of the helix angle Ψ is calculated for the following web thickness measuring procedure, wherein π is a ratio of the circumference of a circle to its diameter.

Figure 11:
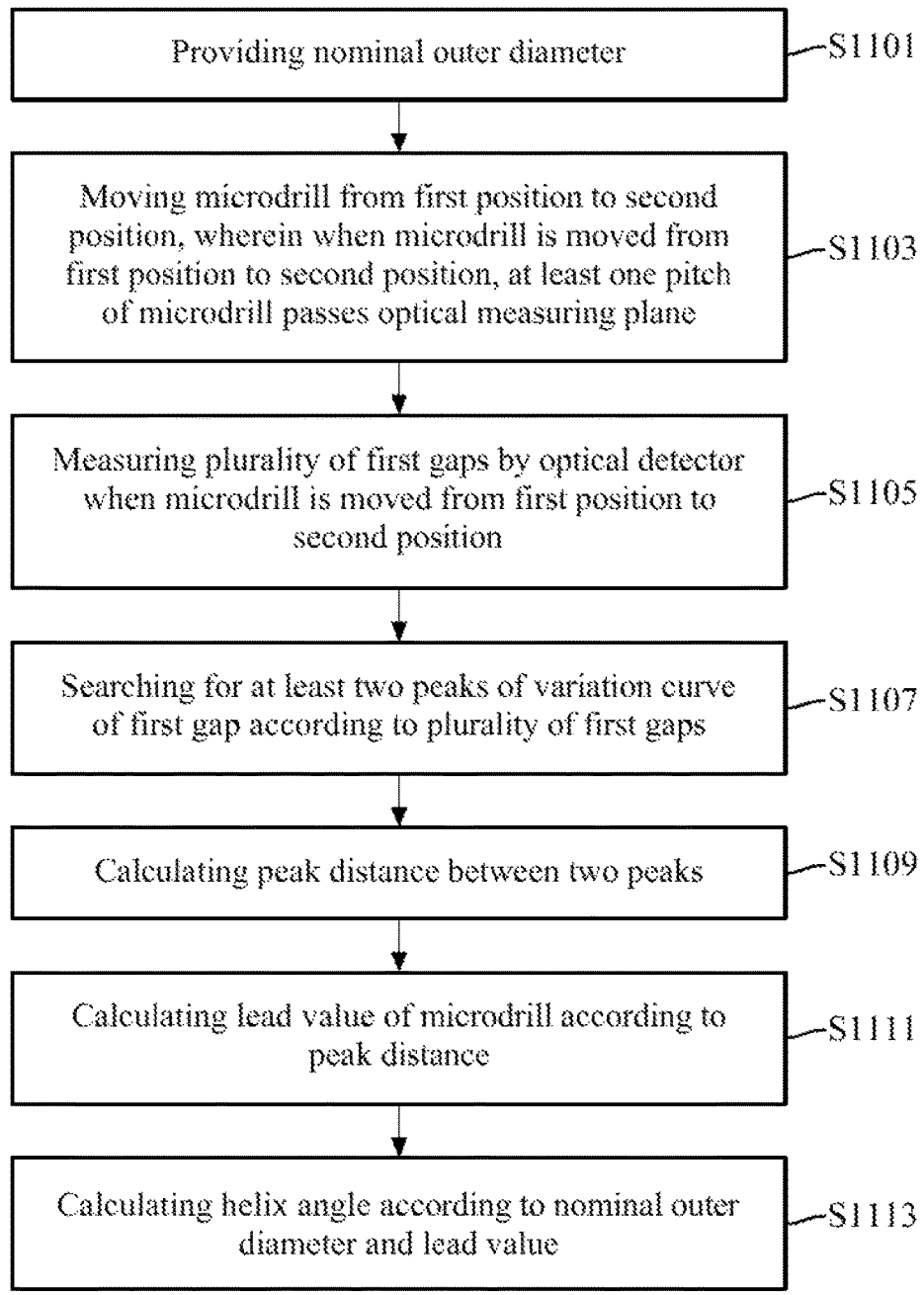
FIG. 11 is a flowchart of an optical-based helix angle measuring procedure according to an embodiment.

In association with the previous explanations of the optical-based helix angle measuring procedure, please refer to FIG. 11. FIG. 11 is a flowchart of an optical-based helix angle measuring procedure according to an embodiment. The optical-based helix angle measuring procedure includes the following steps. In the step S1101, a nominal outer diameter of the microdrill 50 is provided. In the step S1103, the microdrill 50 is moved from a first position to a second position, wherein when the microdrill 50 is moved from the first position to the second position, at least one pitch of the microdrill 50 passes the optical measuring plane 71. In the step S1105, all of the first gaps are measured by the optical sensor 104 when the microdrill 50 is moved from the first position to the second position. In the step S1107, at least two peak positions are found in the variation curve of the first gap. In the step S1109, a peak distance between two adjacent peak positions is calculated. In the step S1111, a lead value of the microdrill 50 is calculated according to the aforementioned peak distance. In the step S1113, a helix angle is calculated according to the nominal outer diameter and the lead value.

Figure 12A:
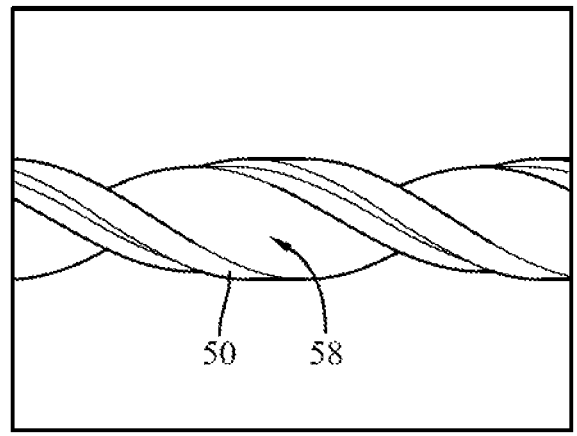
FIG. 12A~12B are diagrams of the needed parameters corresponding to the microdrill images in the image-based helix angle measuring procedure according to a further embodiment.
Figure 12B:
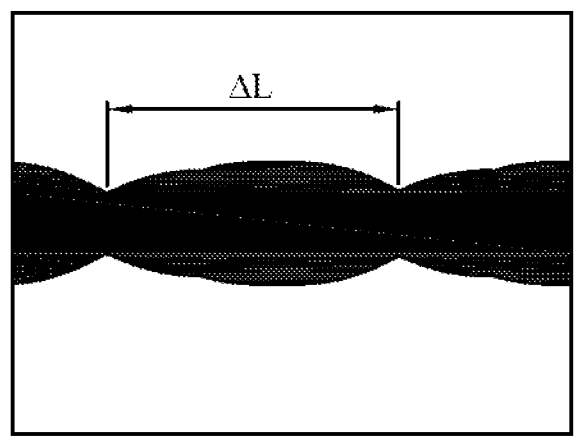

In the embodiment corresponding to FIG. 7, the non-destructive and optical measurement automation system for web thickness of microdrills 100" measures the helix angle according to the image-based helix angle measuring procedure. Please refer to FIG. 12A~12B. FIG. 12A~12B are diagrams of the needed parameters corresponding to the microdrill images in the image-based helix angle measuring procedure according to a further embodiment. In the helix angle measuring procedure of the present embodiment, the starting position of the microdrill 50 in the beginning is identical to the positioning position after the drill tip positioning procedure is finished. Next, the computer device 108 drives the linear motion stage 101 to move the microdrill 50 a wanted distance along the x axis and place the microdrill 50 to the measuring position, so that the camera 111" captures a helical flute image of at least one of the helical flutes 58 of the microdrill 50 through the lens 112". Next, the computer device 108 executes the image processing method on the helical flute image to obtain a plurality of contour points. Next, peak distances between two adjacent peaks or trough distances between two troughs are determined according to the plurality of contour points, wherein the value of the peak distance or trough distance is the aforementioned pitch ΔL. Last, the helix angle Ψ is calculated according to the pitch ΔL, the nominal outer diameter value $D_n$, and the aforementioned equation of helix angle for the following web thickness measuring procedure.

Figure 13:
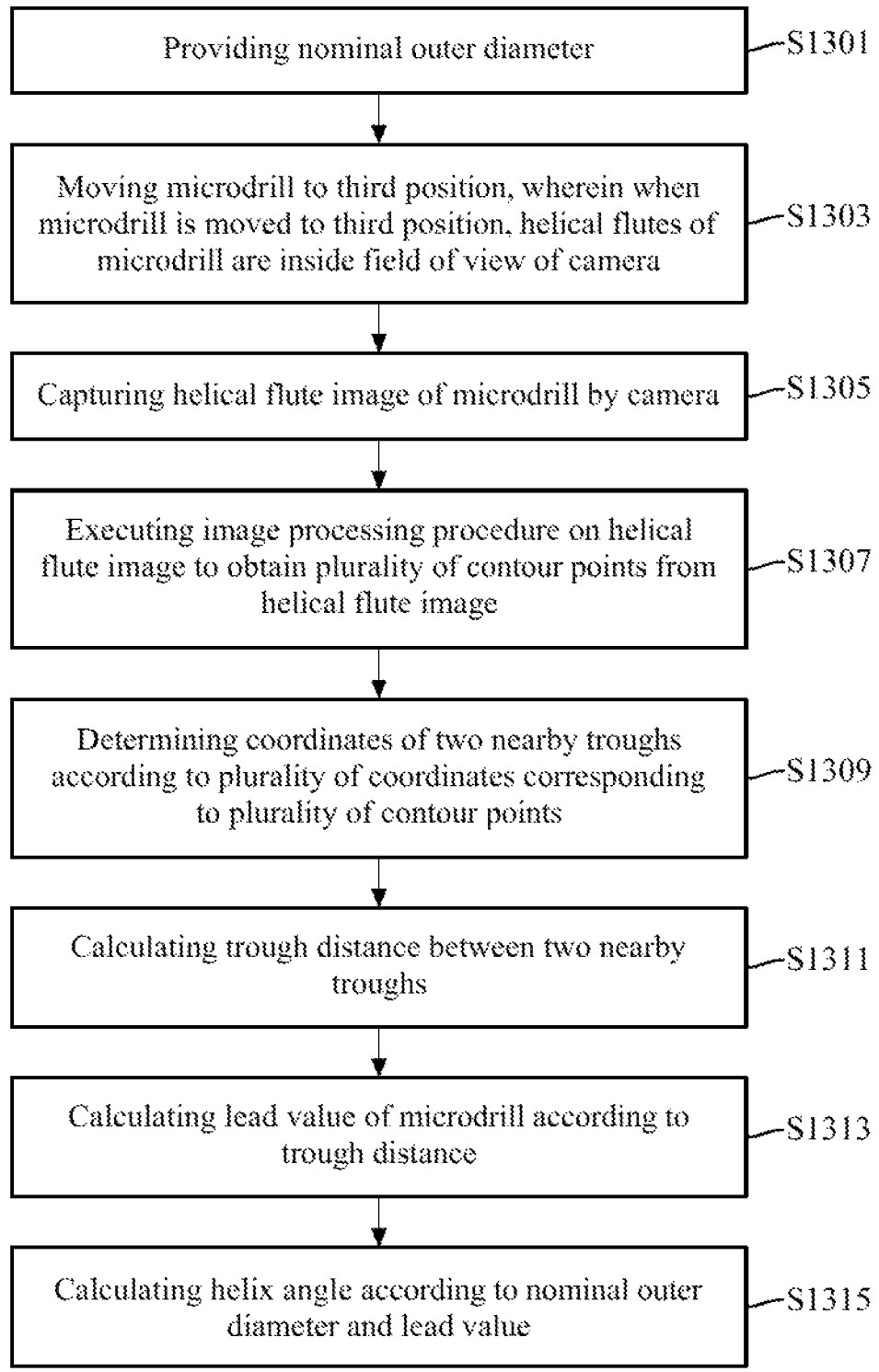
FIG. 13 is a flowchart of an image-based helix angle measuring procedure according to a further embodiment.

In association with the previous explanations of the image-based helix angle measuring procedure, please refer to FIG. 13. FIG. 13 is a flowchart of an image-based helix angle measuring procedure according to a further embodiment. The image-based helix angle measuring procedure includes the following steps. In the step S1301, a nominal outer diameter is provided. In the step S1303, the microdrill 50 is moved to a third position, and when the microdrill 50 is in the third position, the helical flutes 58 of the microdrill 50 are inside the field of view of the camera 111". In the step S1305, the helical flute image of the microdrill 50 is captured. In the step S1307, an image processing procedure is executed on the helical flute image to obtain a plurality of contour points of the helical flute image. In the step S1309, the coordinates of two adjacent troughs are determined according to the coordinates of the contour points. In the step S1311, a trough distance between two adjacent troughs is calculated according to the aforementioned measurements. In the step S1313, a lead value of the microdrill 50 is calculated according to the trough distance. In the step S1315, a helix angle is calculated according to the nominal outer diameter and the lead value.

In fact, because as in the embodiment of FIG. 7, the non-destructive and optical measurement automation system for web thickness of microdrills 100" also includes the optical sensor 104", the embodiment in FIG. 7 also obtains the helix angle of the microdrill 50 to be measured according to the optical-based helix angle measuring procedure as shown in FIG. 11. In the embodiment of FIG. 7, the user can apply one of the helix angle measuring procedures to obtain the helix angle or compare the two results from the two procedures. The embodiment is for illustrating but not for limiting the present invention.

After the helix angle measuring procedure is finished, the computer device 108 obtains the helix angle Ψ and drives the linear motion stage 101 to move the microdrill 50 to a default position. The default position is but not limited to a positioning position after the drill tip positioning procedure is finished. Next, the non-destructive and optical measurement automation system for web thickness of microdrills 100 measures the web thickness of the microdrill 50 to be measured according to the web thickness measuring procedure.

Figure 14A:
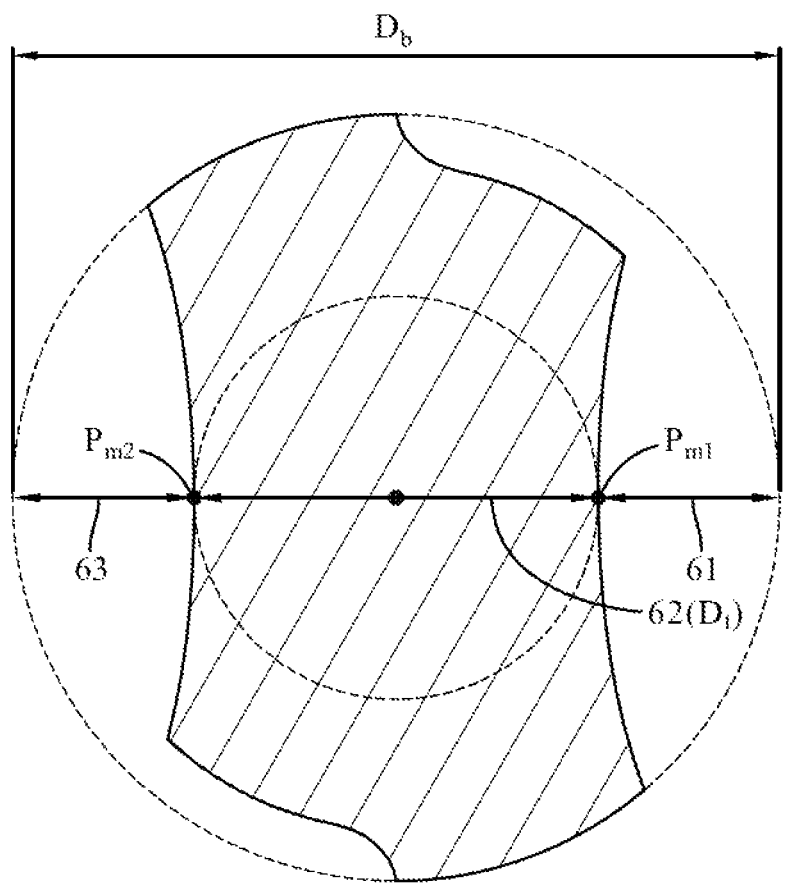
FIG. 14A is a vertical sectional view of a ST-type microdrill according to an embodiment.
Figure 14B:
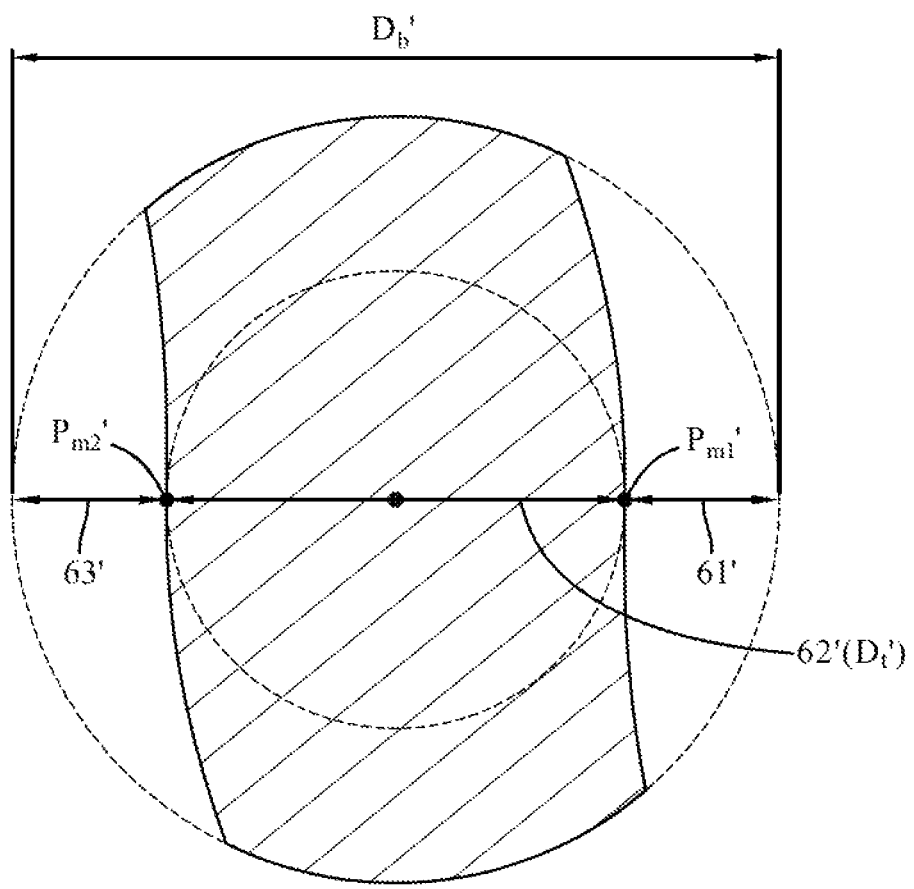
FIG. 14B is a vertical sectional view of a UC-type microdrill according to an embodiment.

Please refer to FIG. 14A and FIG. 14B. FIG. 14A is a vertical sectional view of a ST-type microdrill according to an embodiment. FIG. 14B is a vertical sectional view of a UC-type microdrill according to an embodiment. As shown in FIG. 14A and FIG. 14B, in both the ST-type microdrill 50 and the UC-type microdrill 50', the outer diameter $D_b$ of the microdrill 50 is identical to the diameter of the common tangent circle $D_t$ plus the corresponding two helical flute depths 61 and 63, and the outer diameter $D_b'$ of the microdrill 50' is identical to the diameter of the common tangent circle $D_t'$ plus the corresponding two helical flute depths 61' and 63', wherein the diameter of the common tangent circle $D_t$ is the web thickness 62 and the diameter of the common tangent circle $D_t'$ is the web thickness 62'. The following two embodiments explain the practical procedures of measuring the web thickness of the ST-type microdrill 50 and the UC-type microdrill 50' with the web thickness measuring procedure.

Next, please refer to FIG. 15A~15F for assistant explanations. FIG. 15A is a schematic lateral view of a ST-type microdrill at the first angular position according to an embodiment. FIG. 15D is a lateral view of a ST-type microdrill at the second angular position according to an embodiment. FIG. 15B is a sectional view of a ST-type microdrill at the first angular position along the section line 15B-15B according to an embodiment. FIG. 15C is a sectional view of a ST-type microdrill at the first angular position along the section line 15C-15C according to an embodiment. FIG. 15E is a sectional view of a ST-type microdrill at the second angular position along the section line 15E-15E according to an embodiment. FIG. 15F is a sectional view of a ST-type microdrill at the second angular position along the section line 15F-15F according to an embodiment.

Extending from the aforementioned explanation, when the ST-type microdrill 50 rotates to the first angular position around the central axis, the sections according to the section lines 15B-15B and 15C-15C are respectively shown in FIG. 15B and FIG. 15C. It is worth mentioning that the connection length between the point $P_{m1}$ and $P_{m2}$ illustrated in FIG. 15B is the outer diameter value of the microdrill 50, that is, the outer diameter $D_b$ illustrated in FIG. 14, and the points $P_{m1}$ and $P_{m2}$ are also located at the edges of the section of FIG. 15C of the microdrill 50. Currently, the edge of the section of FIG. 15C in which the point $P_{m1}$ locates is a convex contour.

Figure 16A:
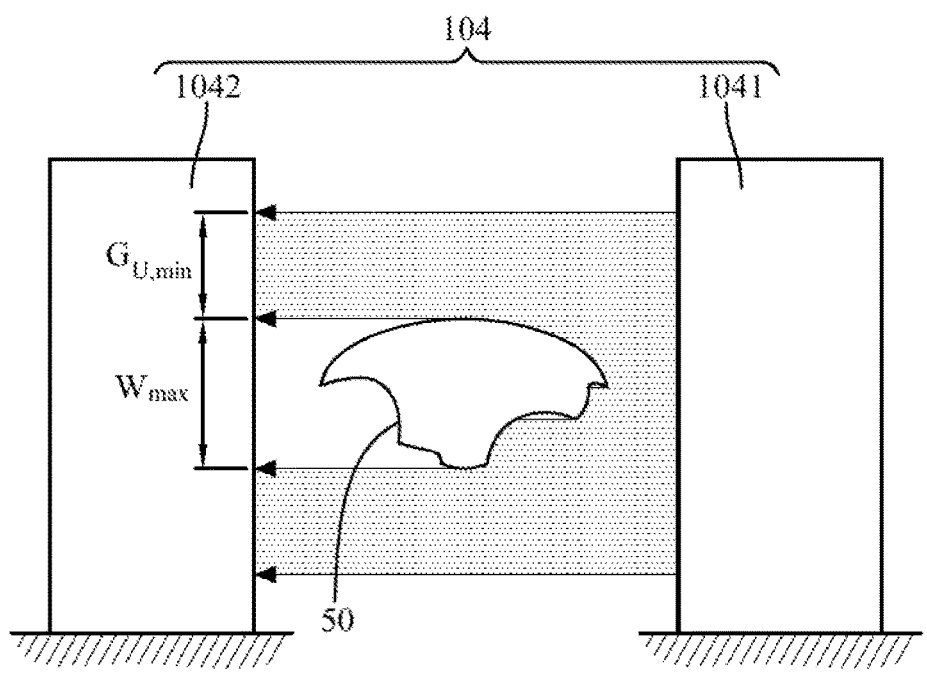
FIG. 16A is a diagram of that the section of FIG. 15C is on the measuring plane when the ST-type microdrill is at the first angular position according to an embodiment.

Please refer to FIG. 16A together. FIG. 16A is a diagram of that the section of FIG. 15C is on the optical measuring plane when the ST-type microdrill at in the first angular position according to an embodiment. As shown in FIG. 16A, when the section of FIG. 15C is on the optical measuring plane formed by the measuring light beam, the measuring light beam and the optical measuring plane is tangent to the point $P_{m1}$ and the detecting module 1042 measures the corresponding minimum first gap $G_{U,min(1)}$. When the microdrill 50 rotates 180 degrees around the central axis, the point $P_{m2}$ is on the convex contour, and the optical measuring plane is tangent to the $P_{m2}$, and the detecting module 1042 measures the corresponding minimum first gap $G_{U,min(2)}$. In fact, when the detecting module 1042 measures the minimum first gaps $G_{U,min(1)}$ and $G_{U,min(2)}$, the detecting module 1042 also measures the maximum sectional width $W_{max}$ at the same time. Referring to FIG. 15C and FIG. 16A together, the maximum sectional width $W_{max}$ is the outer diameter $D_b$ of the microdrill 50.

Figure 16B:
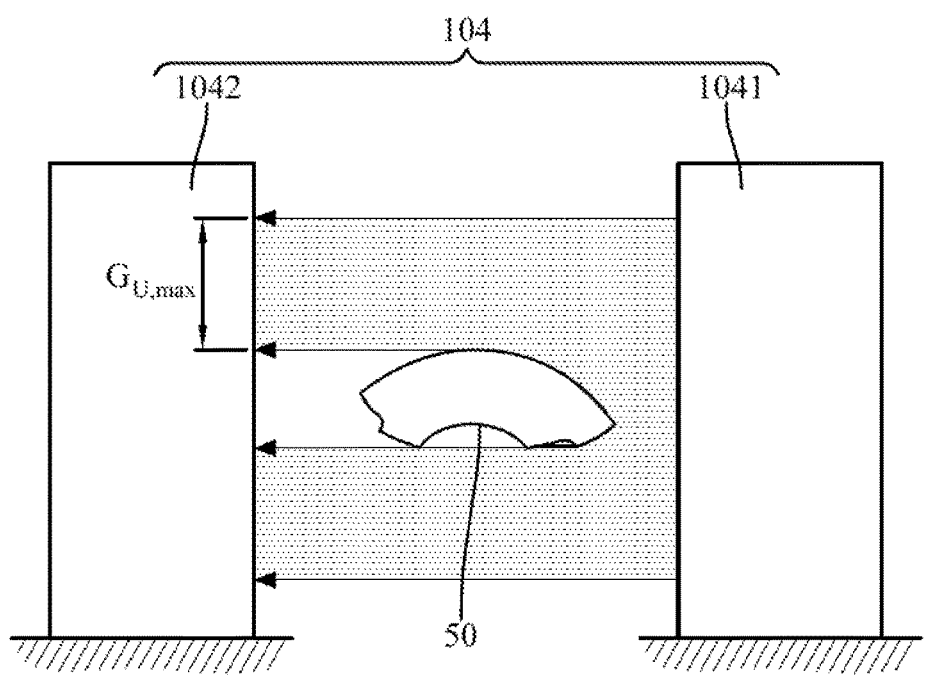
FIG. 16B is a diagram of that the section of FIG. 15F is on the measuring plane when the ST-type microdrill is at the second angular position according to an embodiment.

Similarly, as shown in FIG. 15D, FIG. 15E, and FIG. 15F, the connection distance between $P_{t1}$ and $P_{t2}$ is the diameter of the common tangent circle of the microdrill 50, and the points $P_{t1}$ and $P_{t2}$ are also located on the edges of the section of FIG. 15F of the microdrill 50. The edge of the section of FIG. 15F in which the point $P_{t1}$ locates is a convex contour. Please refer to FIG. 16B together. FIG. 16B is a diagram of that the section of FIG. 15F is on the optical measuring plane when the ST-type microdrill is at the second angular position according to an embodiment. As shown in FIG. 16B, when the section of FIG. 15F is on the optical measuring plane formed by the measuring light beam, the optical measuring plane is tangent to the point $P_{t1}$, so that the detecting module 1042 measures the corresponding maximum first gap $G_{U,max(1)}$. When the microdrill 50 rotates 180 degrees around the central axis, the point $P_{t2}$ is on the convex contour and the optical measuring plane formed by the measuring light beam passes the point $P_{t2}$, so that the detecting module 1042 measures the corresponding maximum first gap $G_{U,max(2)}$.

The aforementioned measurement is also suitable for the UC-type microdrill. Please refer to FIG. 15G~15L. FIG. 15G is a lateral view of a UC-type microdrill at the third angular position according to an embodiment. FIG. 15H is a sectional view of a UC-type microdrill at the third angular position along the section line 15H-15H according to an embodiment. FIG. 15I is a sectional view of a UC-type microdrill at the third angular position along the section line 15I-15I according to an embodiment. FIG. 15J is a lateral view of a UC-type microdrill at the fourth angular position according to an embodiment. FIG. 15K is a sectional view of a UC-type microdrill at the fourth angular position along the section line 15K-15K according to an embodiment. FIG. 15L is a sectional view of a UC-type microdrill at the fourth angular position along the section line 15L-15L according to an embodiment. When the UC-type microdrill 50' rotates to the third angular position around the central axis, the sections according to the section lines 15H-15H and 15I-15I are respectively shown in FIG. 15H and FIG. 15I. As the aforementioned explanation, the connection length between the point $P_{m1}'$ and $P_{m2}'$ illustrated in FIG. 15H is the outer diameter value $D_b'$ of the microdrill 50', and the point $P_{m1}'$ and $P_{m2}'$ are on the edges of the section of FIG. 15I of the microdrill 50'. Currently, the edge of the section of FIG. 15I in which the point $P_{m1}'$ locates is a convex contour.

Figure 16C:
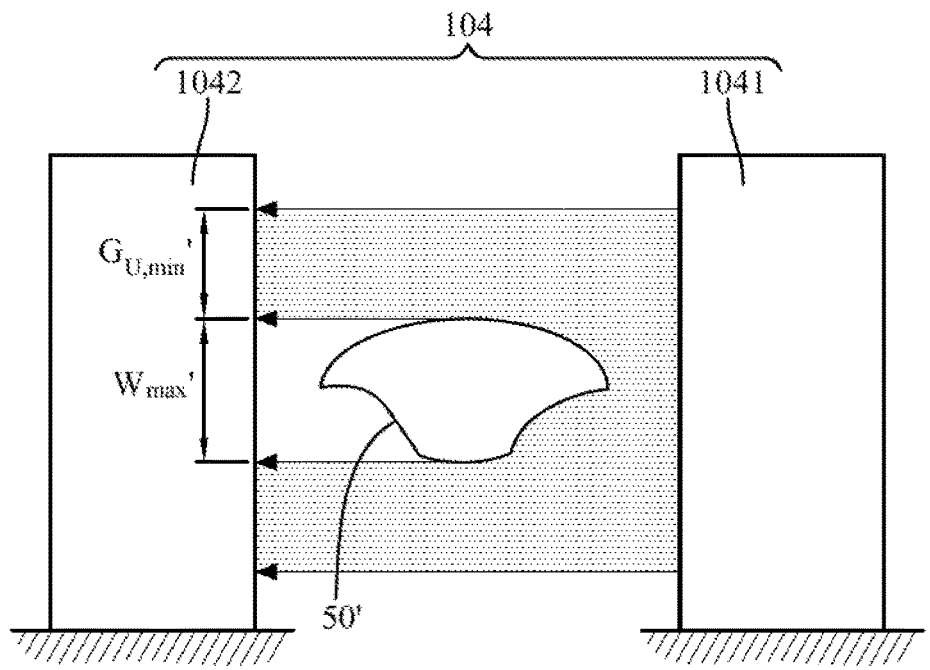
FIG. 16C is a diagram of that the section of FIG. 15I is on the measuring plane when the UC-type microdrill is at the third angular position according to an embodiment.

Please refer to FIG. 16C together. FIG. 16C is a diagram of that the section of FIG. 15I is on the measuring plane when the UC-type microdrill 50' is at the third angular position according to an embodiment. As shown in FIG. 16C, when the section of FIG. 15I is on the optical measuring plane formed by the measuring light beam, the measuring light beam and the optical measuring plane is tangent to the point $P_{m1}'$, so that the detecting module 1042 measures the corresponding minimum first gap $G_{U,min(1)}'$. When the microdrill 50' rotates 180 degrees around the central axis, the point $P_{m2}'$ is on the convex contour and the measuring light beam is tangent to the point $P_{m2}'$, so that the detecting module 1042 measures the corresponding minimum first gap $G_{U,min(2)}'$. As the aforementioned explanation, when the detecting module 1042 measures the minimum first gaps $G_{U,min(1)}'$ and $G_{U,min(2)}'$, the detecting module 1042 measures the maximum sectional width $W_{max}'$ at the same time. Referring to FIG. 15I and FIG. 16C together, the maximum sectional width $W_{max}'$ is the outer diameter $D_b'$ of the microdrill 50'.

Figure 16D:
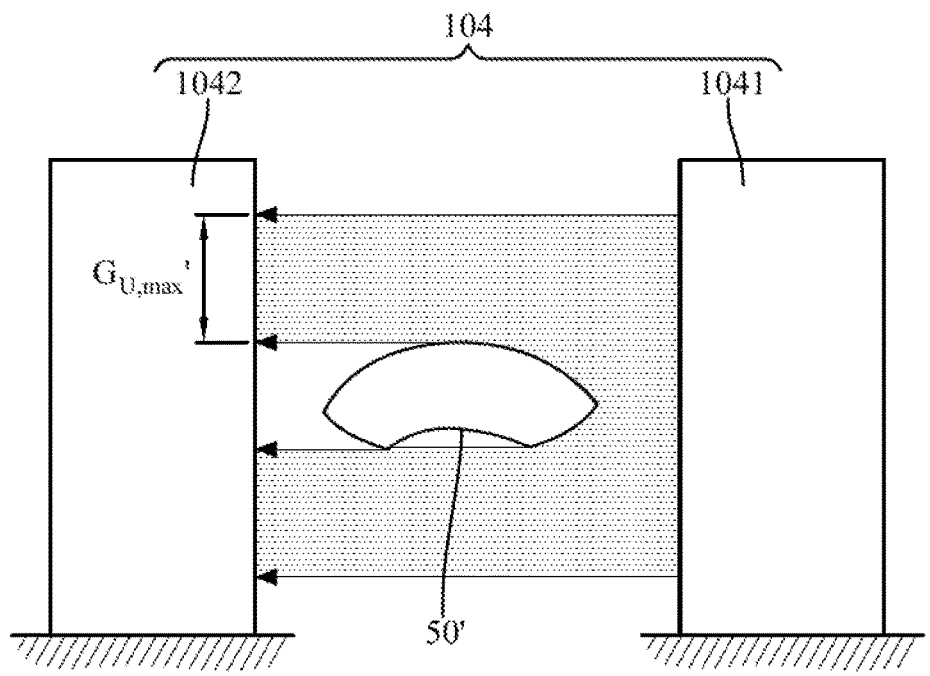
FIG. 16D is a diagram of that the section of FIG. 15L is on the measuring plane when the UC-type microdrill is at the fourth angular position according to an embodiment.

Similarly, as shown in FIG. 15J, FIG. 15K, and FIG. 15L, the connection distance between $P_{t1}'$ and $P_{t2}'$ is the diameter of the common tangent circle of the microdrill 50', and the points $P_{t1}'$ and $P_{t2}'$ are also located at the edges of the section of FIG. 15L of the microdrill 50'. The edge of the section of FIG. 15L in which the point $P_{t1}'$ locates is a convex contour. Please refer to FIG. 16D together. FIG. 16D is a diagram of that the section of FIG. 15L is on the optical measuring plane when the UC-type microdrill is at the fourth angular position according to an embodiment. As shown in FIG. 16D, when the section of FIG. 15L is on the optical measuring plane formed by the measuring light beam, the optical measuring plane is tangent to the point $P_{t1}'$, so that the detecting module 1042 measures the corresponding maximum first gap $G_{U,max(1)}'$. When the microdrill 50' rotates 180 degrees around the central axis, the point $P_{t2}'$ is on the convex contour and the optical measuring plane formed by the measuring light beam passes the point $P_{t2}'$, so that the detecting module 1042 measures the corresponding maximum first gap $G_{U,max(2)}'$.

Figure 17A:
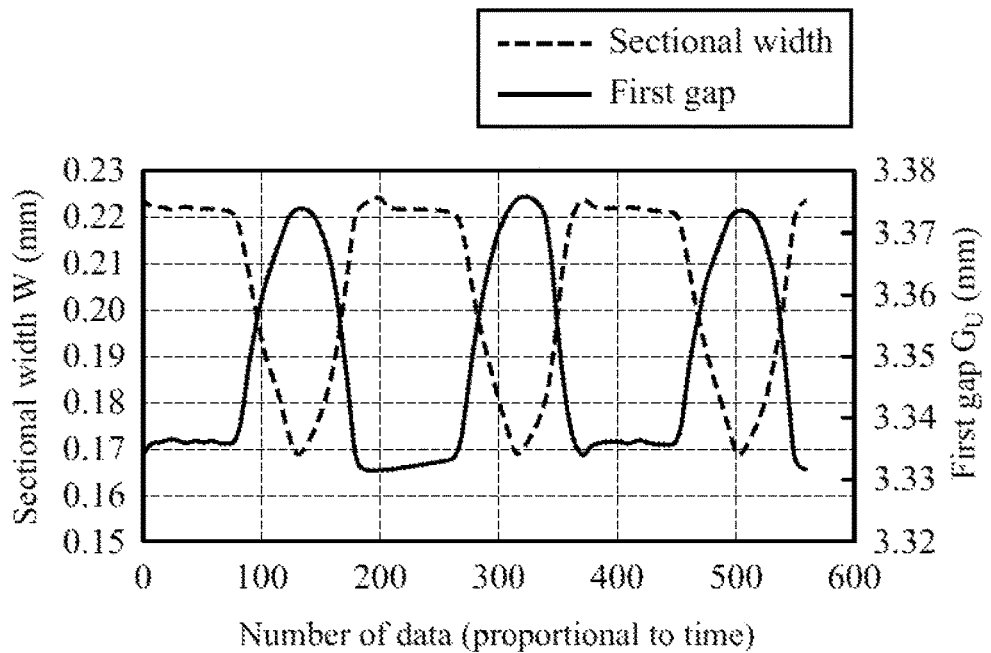
FIG. 17A is a variation diagram of the values of the first gap and the sectional width with respect to time (proportional to number of data) when executing the web thickness measuring procedure according to an embodiment.
Figure 17B:
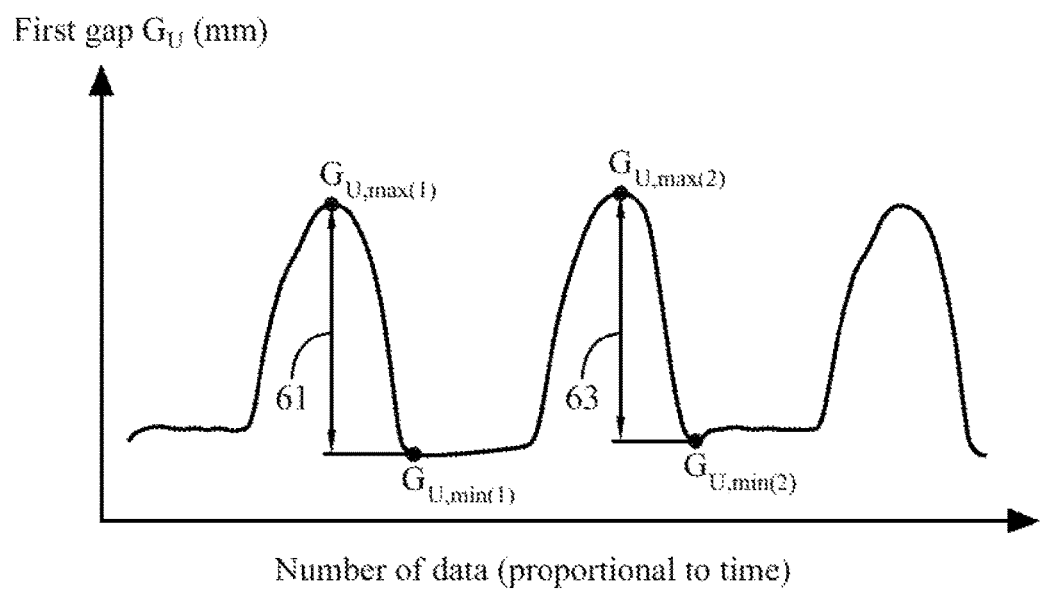
FIG. 17B is a detailed variation diagram of the values of the first gap with respect to time (proportional to number of data) when executing the web thickness measuring procedure according to an embodiment.

Therefore, after the ST-type microdrill 50 or the UC-type microdrill 50' rotates at least one cycle through the rotary spindle-chuck 103, the optical sensor 104 measures at least one set of the maximum first gap $G_{U,max(1)}$, $G_{U,max(2)}$ or $G_{U,max(1)}'$, $G_{U,max(2)}'$ and a plurality of minimum first gaps $G_{U,min(1)}$, $G_{U,min(2)}$ or $G_{U,min(1)}'$, $G_{U,min(2)}'$ as shown in FIG. 17A and FIG. 17B. FIG. 17A is a variation diagram of the values of the first gap and the sectional width with respect to time (proportional to number of data) when executing the web thickness measuring procedure according to an embodiment. FIG. 17B is a detailed variation diagram of the values of the first gap with respect to time (proportional to number of data) when executing the web thickness measuring procedure according to an embodiment. As shown in FIG. 17A, the variation of the measured first gap $G_U$ is opposite to the variation of the sectional width W in practice, that is, when the first gap $G_U$ increases, the sectional width W decreases accordingly, and when the first gap $G_U$ decreases, the sectional width W increases accordingly.

In an embodiment, the computer device 108 is able to calculate the values of the helical flute depths 61 and 63 only depending on the first gap $G_U$. The computer device 108 is able to determine a plurality of maximum first gaps $G_{U,max}$ and a plurality of minimum first gaps $G_{U,min}$ from the measured first gap $G_U$. The aforementioned plurality of maximum first gaps $G_{U,max}$ and the plurality of minimum first gaps $G_{U,min}$ are the local maximums and local minimums of the first gap $G_U$. Specifically, as the variation curve of $G_U$ shown in FIG. 17B, the plurality of maximum first gaps $G_{U,max}$ correspond to the peaks in the variation curve and the plurality of minimum first gaps $G_{U,min}$ correspond to the troughs in the variation curve.

Extending from the previous embodiment, the computer device 108 calculates the values $d_{f1}$ and $d_{f2}$ of the helical flute depths 61 and 63 of the ST-type microdrill 50 according to the plurality of maximum first gaps and minimum first gaps $G_{U,max(1)}$, $G_{U,max(2)}$, $G_{U,min(1)}$, $G_{U,min(2)}$ and the following equations (3) and (4):

$$d_{f1} = G_{U,max(1)} - G_{U,min(1)} \quad (3)$$

$$d_{f2} = G_{U,max(2)} - G_{U,min(2)} \quad (4)$$

and the following equation (5):

$$\text{web thickness value} = D_t = \overline{P_{t1}P_{t2}} = D_b - (d_{f1} + d_{f2}) \quad (5)$$

Therefore, the computer device 108 determines the web thickness of the ST-type microdrill 50.

In fact, the computer device 108 also calculates the values $d_{f1}'$ and $d_{f2}'$ of the helical flute depths 61 and 63 of the UC-type microdrill 50' according to the plurality of maximum first gaps and minimum first gaps $G_{U,max(1)}'$, $G_{U,max(2)}'$, $G_{U,min(1)}'$, $G_{U,min(2)}'$ and the following equations (6) and (7):

$$d_{f1}' = G_{U,max(1)}' - G_{U,min(1)}' \quad (6)$$

$$d_{f2}' = G_{U,max(2)}' - G_{U,min(2)}' \quad (7)$$

and the following equation (8):

$$\text{web thickness value} = D_t' = \overline{P_{t1}'P_{t2}'} = D_b' - (d_{f1}' + d_{f2}') \quad (8)$$

Therefore, the computer device 108 determines the web thickness of the UC-type microdrill 50'.

Consequently, in the web thickness measuring procedure, the computer device 108 firstly drives the rotary motion stage 106, so that the second carrying platform 105 rotates around the aforementioned z axis and the included angle between the central axis of the microdrill 50 to be measured and the optical measuring plane is practically consistent with the aforementioned helix angle Ψ. In addition, the computer device 108 further drives the linear motion stage 101 to place a certain section to be measured of the microdrill 50 on the optical measuring plane. Next, the computer device 108 further drives the rotary spindle-chuck 103 to rotate around the central axis of the microdrill 50 at least one cycle.

When the microdrill 50 rotates, the contour of the microdrill 50 on the measuring plane formed by the measuring light beam also changes according to the rotation. Therefore, the first gap $G_U$ measured by the detecting module 1042 changes accordingly. The computer device 108 firstly determines the maximum first gap $G_{U,max}$ and the minimum first gap $G_{U,min}$ from the measured first gap $G_U$ and calculates the values of the helical flute depths 61 and 63, and the web thickness 62 according to aforementioned methods.

The following explanation only describes that a single section to be measured is measured once and the web thickness is determined according to the single measurement in the web thickness measuring procedure for clarity. However, persons skilled in the art understand that the single section can be also measured several times and the web thickness is determined according to the multiple measurements in the web thickness measuring procedure. Moreover, after measuring the section to be measured, the computer device 108 further drives the linear motion stage 101 to place another section to be measured of the microdrill 50 on the optical measuring plane for another measurement. In other words, the web thicknesses of a plurality of sections to be measured are continuously measured by the non-destructive and optical measurement automation system for web thickness of microdrills 100.

Figure 18:
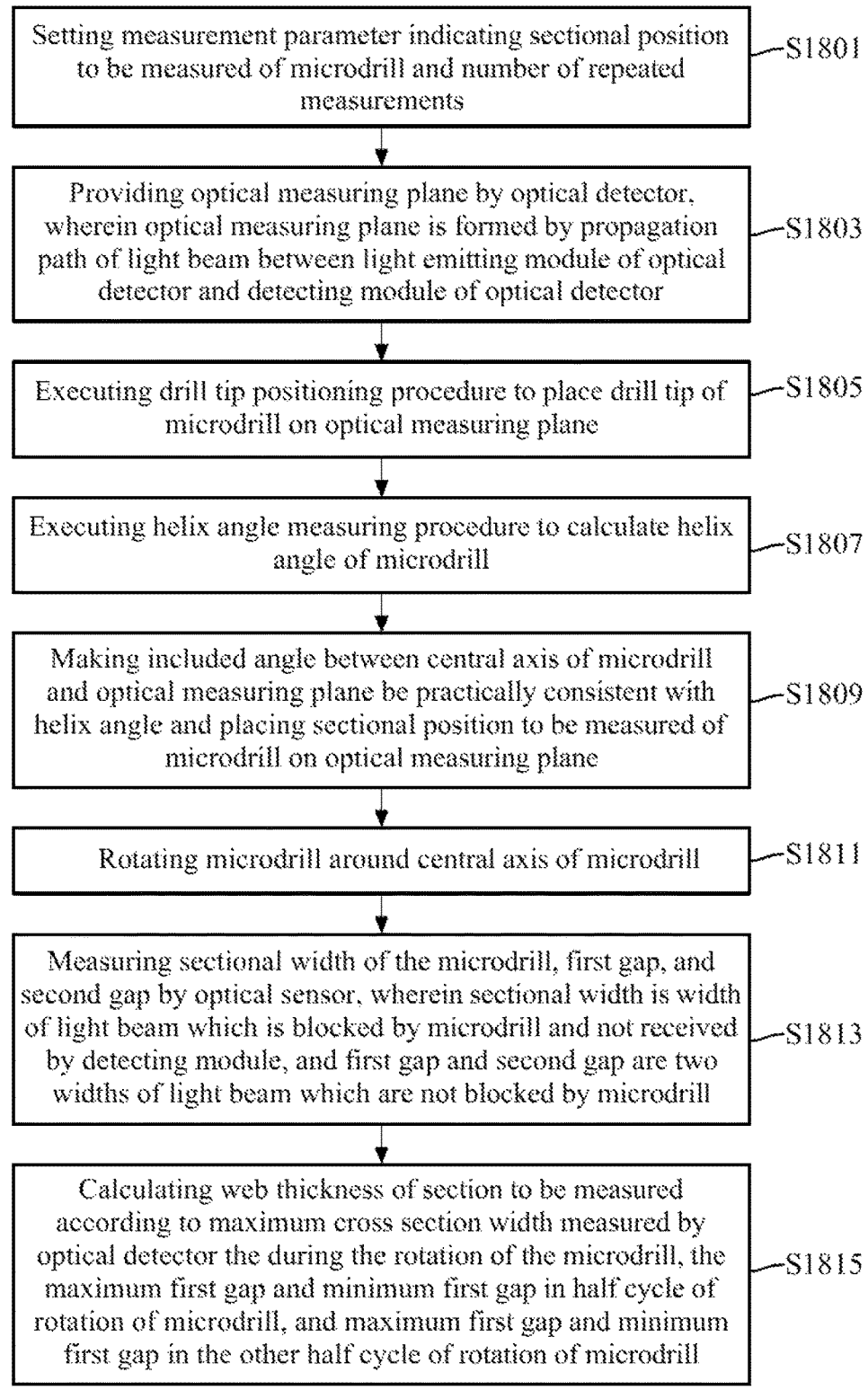
FIG. 18 is a flowchart of the web thickness measuring procedure according to an embodiment.

In association with the previous explanations of the web thickness measuring procedure, please refer to FIG. 18. FIG. 18 is a flowchart of the web thickness measuring procedure according to an embodiment. The web thickness measuring procedure includes the following steps. In the step S1801, a measurement parameter is set, wherein the measurement parameter indicates a sectional position to be measured of the microdrill and a number of repeated measurements. In the step S1803, an optical measuring plane is provided by an optical sensor, wherein the optical measuring plane is formed by a propagation path of a light beam between the light emitting module of the optical sensor and the detecting module of the optical sensor. In the step S1805, a drill tip positioning procedure is executed to place a drill tip of the microdrill on the optical measuring plane. In the step S1807, a helix angle measuring procedure is executed to calculate a helix angle of the microdrill. In the step S1809, an included angle between the central axis of the microdrill and the optical measuring plane is practically consistent with the helix angle and placing the section to be measured of the microdrill on the optical measuring plane. In the step S1811, the microdrill is rotated around the central axis of the microdrill. In the step S1813, a sectional width of the microdrill, a first gap, and a second gap are measured by the optical sensor, wherein the sectional width is a width of the light beam which is blocked by the microdrill and not received by the detecting module, and the first gap and the second gap are two widths which are not blocked by the microdrill. In the step S1815, the web thickness of the section to be measured is calculated according to the maximum sectional width of the light beam measured by the optical sensor during a cycle of rotation of the microdrill, the maximum first gap and the minimum first gap in a half cycle of rotation of the microdrill, and the maximum first gap and the minimum first gap in the other half cycle of rotation of the microdrill.

The non-destructive and optical measurement automation system for web thickness of microdrills and method thereof in an embodiment obtains a corresponding measurement image according to the helix angle of the microdrill by the optical measuring method, and executes signal processing method on the measurement image to obtain the needed feature values of the section to be measured of the microdrill, and calculates the web thickness corresponding to the helical flutes of the section to be measured accordingly. By the innovative optical measurement method and system thereof, the disadvantage of the previous destructive measuring technique which is only suitable of sampling inspection is improved, besides, the hardware cost of the previous non-destructive measuring technique is further reduced and the measuring stability and efficiency are enhanced. In addition, the measured data obtained by the system and method thereof in an embodiment of the present invention are more accurate and stable to fulfill the request of the industry.

The foregoing description has been presented for purposes of illustration. It is not exhaustive and does not limit the disclosure to the precise forms or embodiments disclosed. Modifications and adaptations will be apparent to those skilled in the art from consideration of the specification and practice of the disclosed embodiments of the disclosure. It is intended, therefore, that the specification and examples be considered as exemplary only, with a true scope and spirit of the disclosure being indicated by the following claims and their full scope of equivalents.

What is claimed is:

1. A non-destructive and optical measurement automation system for measuring a web thickness of a microdrill, the system comprising:
   a computer device;
   a linear motion stage electrically connected to the computer device and having a first carrying platform, according to an instruction of the computer device, the linear motion stage making the first carrying platform move along a first axis parallel to a plane at which the first carrying platform locates;
   a rotary spindle-chuck electrically connected to the computer device and on the first carrying platform, for clamping the microdrill to make the central axis of the microdrill parallel to the first axis, and for making the microdrill rotate around the central axis of the microdrill according to the instruction of the computer device;
   a rotary motion stage electrically connected to the computer device and having a second carrying platform, according to the instruction of the computer device, the rotary motion stage making the second carrying platform rotate around a second axis perpendicular to a plane at which the second carrying platform locates, and the second axis is perpendicular to both the first axis and the central axis of the microdrill; and
   an optical sensor, comprising:
      a light emitting module on an end of the second carrying platform, for emitting a light beam; and
      a detecting module electrically connected to the computer device and on the other end of the second carrying platform, for receiving the light beam, so that a propagation path of the light beam forms an optical measuring plane parallel to the second axis, the computer device being configured to control the second carrying platform to rotate around the second axis according to a helix angle of the microdrill, an included angle between the central axis of the microdrill and the optical measuring plane being adjustable by rotation of the second carrying platform to be practically consistent with the helix angle, and when the microdrill is on the optical measuring plane, a sectional width of the microdrill, a first gap, and a second gap are measured, wherein the sectional width is a width of the light beam which is blocked by the microdrill and not received by the detecting module, and the first gap and the second gap are two widths of the light beam which are not blocked by the microdrill;

wherein, the computer device makes a section to be measured of the microdrill be on the optical measuring plane, and the computer device further controls the rotary spindle-chuck to rotate the microdrill around the central axis of the microdrill, and calculates the web thickness of the section to be measured according to the maximum sectional width measured by the detecting module during a cycle of rotation of the microdrill, the maximum first gap and the minimum first gap in a half cycle of rotation of the microdrill, and the maximum first gap and the minimum first gap in the other half cycle of rotation of the microdrill;
   wherein the web thickness is calculated by the following equation:

$$\text{web thickness} = D - (d_1 + d_2),$$

D is the maximum sectional width measured by the detecting module during a cycle of rotation of the microdrill, and d1 is a first helical flute depth of the section to be measured, and d2 is a second helical flute depth of the section to be measured, and the first helical flute depth is the difference between the maximum first gap and the minimum first gap in the half cycle of rotation of the microdrill, and the second helical flute depth is the difference between the maximum first gap and the minimum first gap in the other half cycle of rotation of the microdrill.

2. The system of claim 1, wherein the computer device calculates the helix angle according to a nominal outer diameter of the microdrill and a lead value of the microdrill.

3. The system of claim 1, wherein the computer device determines whether a drill tip of the microdrill is on the optical measuring plane by moving the first carrying platform back and forth along the first axis and by data measured by the detecting module.

4. The system of claim 1, further comprising a camera, a lens, and a back light source, wherein the back light source is on the second carrying platform and between the light emitting module and the detecting module, and both the camera and the lens are above the back light source, and when a drill tip of the microdrill is inside a field of view of the camera, the camera captures a drill tip image of the microdrill through the lens and outputs the drill tip image to the computer device, so that the computer device calculates a positioning distance between the drill tip of the microdrill and the optical measuring plane according to the drill tip image, and the computer device controls the first carrying platform to move the positioning distance towards the optical measuring plane, wherein an extension line of an axis of the lens is perpendicular to the central axis of the microdrill.

5. The system of claim 4, wherein the computer device further calculates a lead value of the microdrill according to a helical flute image of the microdrill captured by the camera.

6. A non-destructive and optical measurement method for measuring a web thickness of a microdrill, the method comprising:
   setting a measurement parameter indicating a sectional position to be measured of the microdrill and a number of repeated measurements;
   providing an optical measuring plane by an optical sensor, wherein the optical measuring plane is formed by a propagation path of a light beam between a light emitting module of the optical sensor and a detecting module of the optical sensor;

executing a drill tip positioning procedure to place a drill tip of the microdrill on the optical measuring plane, wherein the drill tip positioning procedure determines whether the drill tip of the microdrill is on the optical measuring plane by moving the drill tip back and forth along a first axis and by data measured by the optical sensor, and the first axis is parallel to a central axis of the microdrill;

executing a helix angle measuring procedure to calculate a helix angle of the microdrill;

making an included angle between the central axis of the microdrill and the optical measuring plane be practically consistent with the helix angle and placing the sectional position to be measured of the microdrill on the optical measuring plane;

rotating the microdrill around the central axis of the microdrill;

measuring a sectional width of the microdrill, a first gap, and a second gap by the optical sensor, wherein the sectional width is a width of the light beam which is blocked by the microdrill and not received by the detecting module, and the first gap and the second gap are two widths of the light beam which are not blocked by the microdrill; and calculating the web thickness of the section to be measured according to the maximum sectional width measured by the optical sensor during a cycle of rotation of the microdrill, the maximum first gap and the minimum first gap in a half cycle of rotation of the microdrill, and the maximum first gap and the minimum first gap in the other half cycle of rotation of the microdrill;

wherein the web thickness is equal to the maximum sectional width measured by the detecting module during a cycle of rotation of the microdrill minus the sum of a first helical flute depth of the section to be measured and a second helical flute depth of the section to be measured, and the first helical flute depth is the difference between the maximum first gap and the minimum first gap in the half cycle of rotation of the microdrill, and the second helical flute depth is the difference between the maximum first gap and the minimum first gap in the other half cycle of rotation of the microdrill;

wherein the helix angle measuring procedure comprises:
providing a nominal outer diameter;
moving the microdrill from a first position to a second position, wherein when the microdrill is moved from the first position to the second position, at least one pitch of the microdrill passes the optical measuring plane;
measuring a plurality of first gaps by the optical sensor when the microdrill is moved from the first position to the second position;
searching for at least two peaks between a variation curve of the first gap according to the plurality of first gaps;
calculating a peak distance between two peaks;
calculating a lead value of the microdrill according to the peak distance; and
calculating the helix angle according to the nominal outer diameter and the lead value.

7. A non-destructive and optical measurement method for measuring a web thickness of a microdrill, the method comprising:

setting a measurement parameter indicating a sectional position to be measured of the microdrill and a number of repeated measurements;

providing an optical plane by an optical sensor, wherein the optical measuring plane is formed by a propagation path of a light beam between a light emitting module of the optical sensor and a detecting module of the optical sensor;

executing a drill tip positioning procedure to place a drill tip of the microdrill on the optical measuring plane;

executing a helix angle measuring procedure to calculate a helix angle of the microdrill;

making an included angle between the central axis of the microdrill and the optical measuring plane be practically consistent with the helix angle and placing the sectional position to be measured of the microdrill on the optical measuring plane;

rotating the microdrill around the central axis of the microdrill;

measuring a sectional width of the microdrill, a first gap, and a second gap by the optical sensor, wherein the sectional width is a width of the light beam which is blocked by the microdrill and not received by the detecting module, and the first gap and the second gap are two widths of the light beam which are not blocked by the microdrill; and calculating the web thickness of the section to be measured according to the maximum sectional width measured by the optical sensor during a cycle of rotation of the microdrill, the maximum first gap and the minimum first gap in a half cycle of rotation of the microdrill, and the maximum first gap and the minimum first gap in the other half cycle of rotation of the microdrill;

wherein the web thickness is equal to the maximum sectional width measured by the detecting module during a cycle of rotation of the microdrill minus the sum of a first helical flute depth of the section to be measured and a second helical flute depth of the section to be measured, and the first helical flute depth is the difference between the maximum first gap and the minimum first gap in the half cycle of rotation of the microdrill, and the second helical flute depth is the difference between the maximum first gap and the minimum first gap in the other half cycle of rotation of the microdrill;

wherein the drill tip positioning procedure comprises:
moving the microdrill to a first position, wherein when the microdrill is on the first position, the drill tip of the microdrill is inside a field of view of a camera;
capturing a drill tip image of the microdrill by the camera;
obtaining a plurality of first contour points from the drill tip image;
determining a drill tip point according to a plurality of first coordinates corresponding to the plurality of first contour points, wherein the drill tip point is a coordinate of the drill tip of the microdrill in the drill tip image;
calculating a positioning distance between the drill tip of the microdrill and the optical measuring plane according to the drill tip point; and
moving the microdrill the positioning distance towards the optical measuring plane;

wherein the helix angle measuring procedure comprises:
providing a nominal outer diameter;
moving the microdrill to a third position, wherein when the microdrill is moved to the third position, helical flutes of the microdrill are inside the field of view of the camera;

capturing a helical flute image of the microdrill by the camera;

executing an image processing procedure on the helical flute image to obtain a plurality of second contour points from the helical flute image;

determining coordinates of two adjacent troughs according to a plurality of second coordinates corresponding to the plurality of second contour points;

calculating a trough distance between two adjacent troughs;

calculating a lead value of the microdrill according to the trough distance; and calculating the helix angle according to the nominal outer diameter and the lead value.

* * * * *